United States Patent [19]
Enter

[11] Patent Number: 5,526,470
[45] Date of Patent: Jun. 11, 1996

[54] REAL-TIME DOT GENERATOR FOR MULTIPLE-CHANNEL, SLANTED, MATRIX PRINTHEAD

[75] Inventor: Rudolf Enter, Kitchener, Canada

[73] Assignee: NCR Corporation, Dayton, Ohio

[21] Appl. No.: 921,152

[22] Filed: Jul. 29, 1992

[51] Int. Cl.[6] .................................................. G06K 15/00
[52] U.S. Cl. ........................................ 395/115; 395/166
[58] Field of Search .................................... 395/110, 105, 395/108, 115, 116, 164, 165, 166, 150, 101, 109, 117, 114, 112, 104; 358/444, 404

[56] References Cited

U.S. PATENT DOCUMENTS

| | | | |
|---|---|---|---|
| 4,480,541 | 11/1984 | Grummett | 101/93.04 |
| 4,567,570 | 1/1986 | Peer | 364/900 |
| 4,715,006 | 12/1987 | Nagata | 364/523 |
| 4,763,281 | 8/1988 | Arakawa | 364/523 |
| 4,837,712 | 6/1989 | Shibamiya | 364/523 |
| 4,866,671 | 9/1989 | Yokoyama | 364/900 |
| 4,978,971 | 12/1990 | Goetz et al. | 395/105 |

FOREIGN PATENT DOCUMENTS

| | | | |
|---|---|---|---|
| 0027562 | 4/1981 | European Pat. Off. | B41J 3/02 |
| 0422924 | 4/1991 | European Pat. Off. | G06K 15/00 |

*Primary Examiner*—Mark R. Powell
*Assistant Examiner*—Dov Popovici
*Attorney, Agent, or Firm*—James M. Stover

[57] ABSTRACT

Within a document printing system, a dot generator for determining dot ON/OFF states for a multiple channel matrix print head includes a RAM memory in which is stored print characters received from the print system. The received print characters are stored in ASCII format in predetermined character box memory locations within the RAM memory. The dot generator further includes a ROM memory having (1) a first storage area containing an association table correlating each one of the dot print addresses or locations within the document print zone with one of the character box memory locations within the RAM memory; (2) a second storage area containing an association table correlating each one of the dot print locations with a character box print location row and column number; and (3) a third storage area containing dot state ON/OFF values corresponding to each row of each standard ASCII character. A ROM lookup procedure is utilized to determine the ON/OFF state for each dot location within the print zone. In brief, the dot generator performs the followings steps:

(1) The dot generator receives a dot address from the print system and utilizes this address to fetch the character box memory locations (BOX#) for that dot from the first storage area within the ROM.

(2) The dot generator fetches the ASCII character from RAM for the BOX# provided by step 1.

(3) Simultaneously with step 2, the dot generator fetches the ELEMENT#, a number describing a dot's relative position within a character box, from the second storage area within the ROM, (4) The dot generator then extracts the dot's printing state, i.e. ON or OFF, from the third storage are within the ROM using the ASCII character provided by step 2 and the ELEMENT# from step 3.

(5) This process repeats until all channels in the printhead have been determined.

11 Claims, 23 Drawing Sheets

FIG. 2

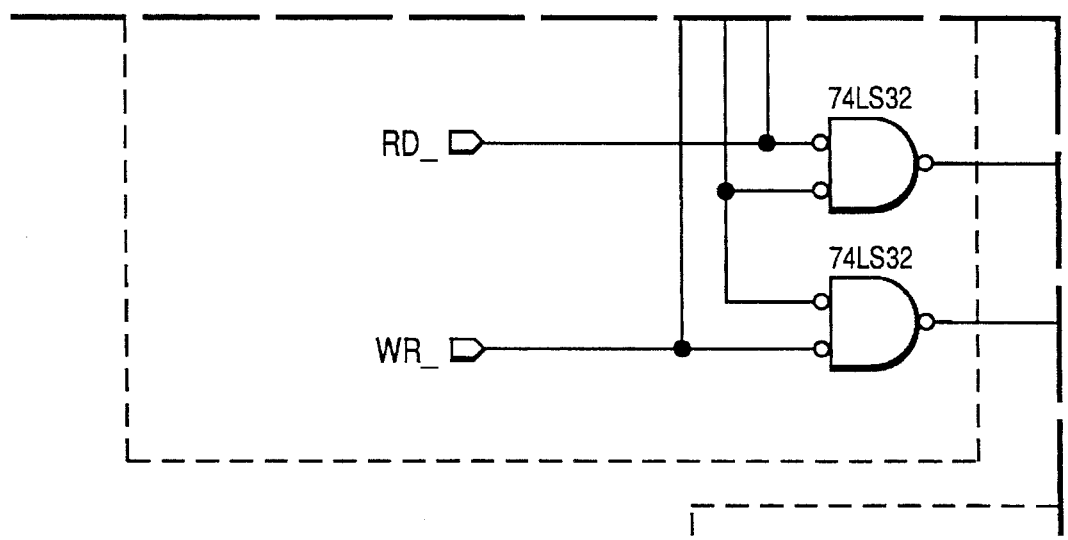
FIG. 5L
TIMING / CONTROL - 401
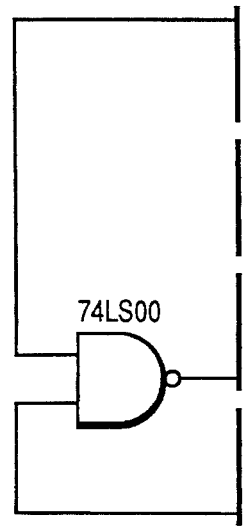
FIG. 5
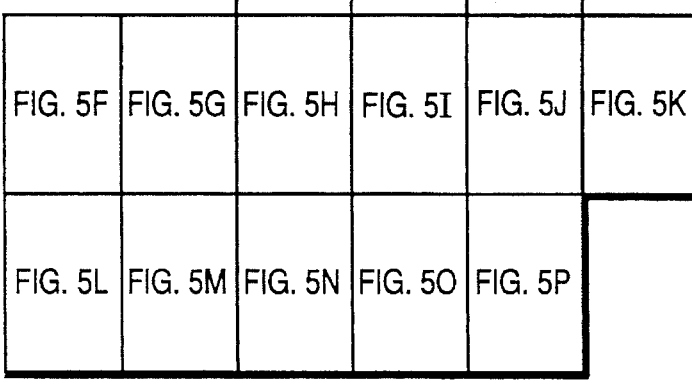

FIG. 7

| CHANNEL = | 150 | 151 | 152 | 153 | 154 | 155 | 156 | 157 | 158 | 159 | 160 | 161 | 162 | 163 | 164 | 165 |
|---|---|---|---|---|---|---|---|---|---|---|---|---|---|---|---|---|
| 0 | 4800 | 4832 | 4864 | 4896 | 4928 | 4960 | 4992 | 5024 | 5056 | 5088 | 5120 | 5152 | 5184 | 5216 | 5248 | 5280 |
| 1 | 4897 | 4929 | 4961 | 4993 | 5025 | 5057 | 5089 | 5121 | 5153 | 5185 | 5217 | 5249 | 5281 | 5313 | 5345 | 5377 |
| 2 | 4994 | 5026 | 5058 | 5090 | 5122 | 5154 | 5186 | 5218 | 5250 | 5282 | 5314 | 5346 | 5378 | 5410 | 5442 | 5474 |
| 3 | 5091 | 5123 | 5155 | 5187 | 5219 | 5251 | 5283 | 5315 | 5347 | 5379 | 5411 | 5443 | 5475 | 5507 | 5539 | 5571 |
| 4 | 5188 | 5220 | 5252 | 5284 | 5316 | 5348 | 5380 | 5412 | 5444 | 5476 | 5508 | 5540 | 5572 | 5604 | 5636 | 5668 |
| 5 | 5285 | 5317 | 5349 | 5381 | 5413 | 5445 | 5477 | 5509 | 5541 | 5573 | 5605 | 5637 | 5669 | 5701 | 5733 | 5765 |
| 6 | 5382 | 5414 | 5446 | 5478 | 5510 | 5542 | 5574 | 5606 | 5638 | 5670 | 5702 | 5734 | 5766 | 5798 | 5830 | 5862 |
| 7 | 5479 | 5511 | 5543 | 5575 | 5607 | 5639 | 5671 | 5703 | 5735 | 5767 | 5799 | 5831 | 5863 | 5895 | 5927 | 5959 |
| 8 | 5576 | 5608 | 5640 | 5672 | 5704 | 5736 | 5768 | 5800 | 5832 | 5864 | 5896 | 5928 | 5960 | 5992 | 6024 | 6056 |

BOX COLUMN = 25, 26, 27
SLANT COLUMN = 25
BOX ROW = 0
BOX ROW = 1

FIG. 9

REAL-TIME DOT GENERATOR FOR MULTIPLE-CHANNEL, SLANTED, MATRIX PRINTHEAD

The present invention relates generally to matrix printers and, more particularly, to matrix printers including multiple-channel print heads having print elements arranged on a slanted, rather than vertical, orientation.

BACKGROUND OF THE INVENTION

Matrix printers, such as dot or pin printers and ink jet printers, typically include a multitude, often a multiple of eight, of print elements arranged in a vertical orientation in relationship to the print medium. However, by slanting the linear arrangement of print head dot elements away from vertical, printing resolution can be improved, while also permitting an element-to-element spacing considerably greater than that permitted by a vertical arrangement of print head dot elements. A greater print output rate can be obtained by utilizing a print head having a number of print elements which span multiple lines of print, thereby printing several rows of text simultaneously.

Two common problems associated with matrix printing, particularly for slanted print heads containing many channels, are:

1. Large matrix heads simultaneously span several columns and rows of characters. This makes the task of calculating element or dot states quite complex.
2. Character matrices that are not 8 bits wide have patterns which cross byte boundaries in memory and the microprocessor registers.

Consider a printer including a 32 channel, demand ink jet print head having a spacing between individual print elements of 1.5 mm. The total span of all 32 elements of the print head is 46.5 millimeters—much larger than desired to print a single column of dots. To print a dot column 15 mm (0.6 in.) high the print head must be tilted at an angle of approximately 19 degrees from horizontal. This results in a vertical channel pitch of about 0.5 mm. This orientation results in these problems:

1. the print head spans the document's print band as a diagonal line, simultaneously covering about 16 character columns and four print lines (for a typical character font 6 dots wide and 8 dots high), and
2. in real time, new states for all 32 channels must be generated every 180 microseconds (for typical document speed of 2640 mm/sec)

Current methods for determining dot states employ several microprocessors and intermediate storage memory to build a complete bit-map image of the print zone before printing begins. Additional processors are required when more than one print head is used in the printer.

OBJECTS OF THE INVENTION

It is therefore an object of the present invention to provide a new and improved method and apparatus for determining dot states for a matrix print head.

It is another object of the present invention to provide such a method and apparatus for determining dot states for a multiple channel, slanted printhead.

It is still a further object of the present invention to provide a method and apparatus which simplifies determination of dot ON/OFF states for a multiple channel print head by eliminating microprocessors and intermediate storage memory required to build a complete bit-map image of the print zone before printing begins.

It is yet another object of the present invention to provide a method for determining dot states for a matrix print head which includes a series of ROM lookup steps to extract appropriate ON/OFF states for a multiple channel print head from a read only memory.

A further object of the present invention is to provide such a method which determines dot states for the printing over-sized characters.

SUMMARY OF THE INVENTION

There is provided, in accordance with the present invention, a method and apparatus for determining dot ON/OFF states for a matrix print head. The apparatus includes a RAM memory in which is stored print characters received from the print system. The received print characters are stored in ASCII format in predetermined character box memory locations within the RAM memory. The apparatus further includes a ROM memory having (1) a first storage area containing an association table correlating each one of the dot print locations within the document print zone with one of the character box memory locations within the RAM memory; (2) a second storage area containing an association table correlating each one of the dot print locations with a character box print location row and column number; and (3) a third storage area containing dot state ON/OFF values corresponding to each row of each standard ASCII character.

A ROM lookup procedure is utilized to determine the ON/OFF state for each dot location within the print zone. Each dot location is identified by a SLANT COLUMN# (or simply COLUMN#), the number specifying the horizontal location of a slant column, and a CHANNEL#, the vertical location of a dot within the print zone. The steps performed by the dot generator are briefly summarized below:

(Step 1.) processor initializes COLUMN# and CHANNEL# at the beginning of the dot generation sequence to form a ROM lookup address (=DOT#), (Step 2.) the dot generator utilizes the lookup address from step 1 to fetch the BOX# for that dot from ROM, (Step 3.) the dot generator then fetches the ASCII character from RAM for the character box (BOX# from step 2), (Step 4.) simultaneously with step 3, the dot generator fetches the ELEMENT#, a number describing a dot's relative position within a character box, for the dot with a second ROM lookup, (Step 5.) the generator then finds the dot's printing state, using the ASCII character (from step 3) and the ELEMENT# (from step 4), (Step 6.) the generator then stores the dot state (from step 5) in a shift register, and (Step 7.) the process repeats from step 2 for all 32 channels; the CHANNEL# is incremented each time.

The above and other objects, features, and advantages of the present invention will become apparent from the following detailed specification when read in conjunction with the accompanying drawings in which applicable reference numerals have been carried forward.

BRIEF DESCRIPTION OF THE DRAWINGS

FIG. 2 illustrates the character matrix layout for the upper left corner of the sample print zone shown in FIG. 1.

FIG. 7 illustrates the dot detail within several character boxes of the sample print zone shown in FIG. 1.

FIG. 9 illustrates single and double-size character matrix layouts for the upper left corner of the sample print zone shown in FIG. 1.

DETAILED DESCRIPTION OF THE PREFERRED EMBODIMENT

The dot generator logic of the present invention is utilized within a matrix printer which divides a document's print zone into a grid of character boxes, defined by rows and columns, each containing one ASCII character. Furthermore, each character box is a matrix of dots or elements, defined by rows and columns. As the document moves past the print head the dot generator logic determines for each channel whether it needs to be fired to place a dot at that location on the document.

Presented below is a list of definitions for terms utilized in the description of the invention which follows. These terms are best understood by referring to FIGS. 1 and 2.

GRID: The array of rows and columns of printed characters in a document's print zone.

BOX#: The number of a printed character's absolute position on the document grid. It is comprised of a box row and box column number.

MATRIX: The array of rows and columns of dots or elements within a character box. It is comprised of matrix rows and columns.

ELEMENT#: A number describing an element's/dot's relative position within the character matrix. It is comprised of a matrix row and column number.

SLANT COLUMN: A group of dots printed simultaneously by the print head's multiple channels. Because of the head's orientation this group is slanted, rather than being a vertical column.

SLANT COLUMN# (or simply COLUMN#): The number specifying the horizontal location of a slant column. It is counted by the top channel's dot position, starting from the left edge of the print zone with 0.

CHANNEL#: The vertical location of a dot within the print zone, starting from the top with 0.

DOT#: The unique sequential number of each individual dot print location on a document (approx. 12K). Dots falling outside the actual printing area (due to head slant) are also included. This number is the combination of the SLANT COLUMN# and the CHANNEL#

DOT STATE: The output of one dot generator calculation is an ON/OFF state which controls whether a print head channel will be activated to print a dot.

Figure 1:
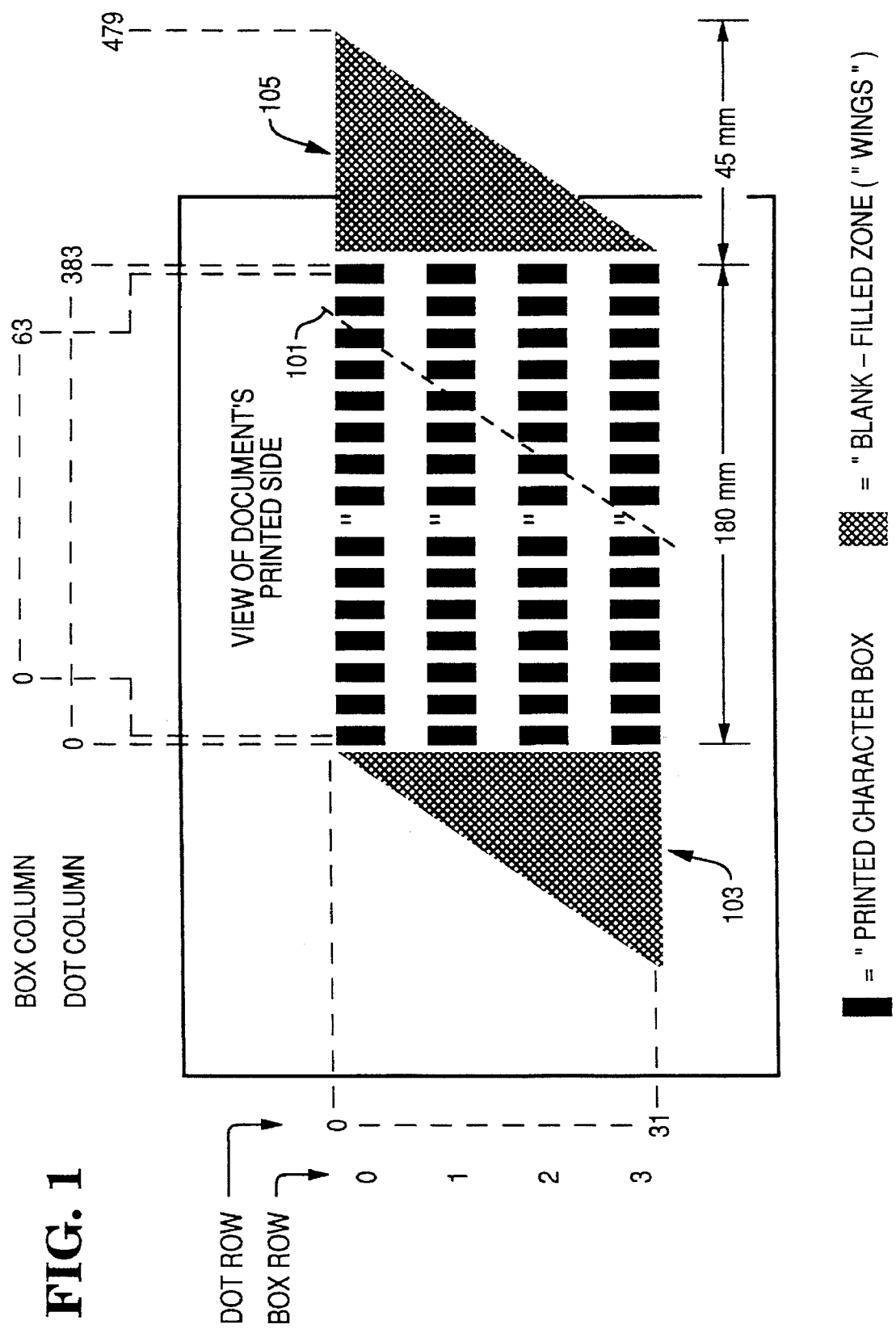
FIG. 1 illustrates the layout for a sample print zone including four rows of characters printed simultaneously by a thirty-two channel slanted printhead.

A layout for a sample print zone including four rows of characters printed simultaneously by a thirty-two channel, slanted printhead is shown in FIG. 1. The sample print zone is 180 millimeters wide and includes 384 dot columns, numbered 0 through 383, at 2.1 columns per millimeter. The 384 dot by 32 dot print zone matrix includes 256 dot character boxes arranged in four box rows, numbered 0 through 3, and 64 box columns, numbered 0 through 63.

The diagonal line identified by reference numeral 101 illustrates how the print head diagonally spans the print zone, and thus how dot calculations involve many dot columns and all dot rows. FIG. 1 also shows that when printing dots near the zone's ends, some channels fall outside the print zone, represented by shaded areas 103 and 105.

Figure 2:
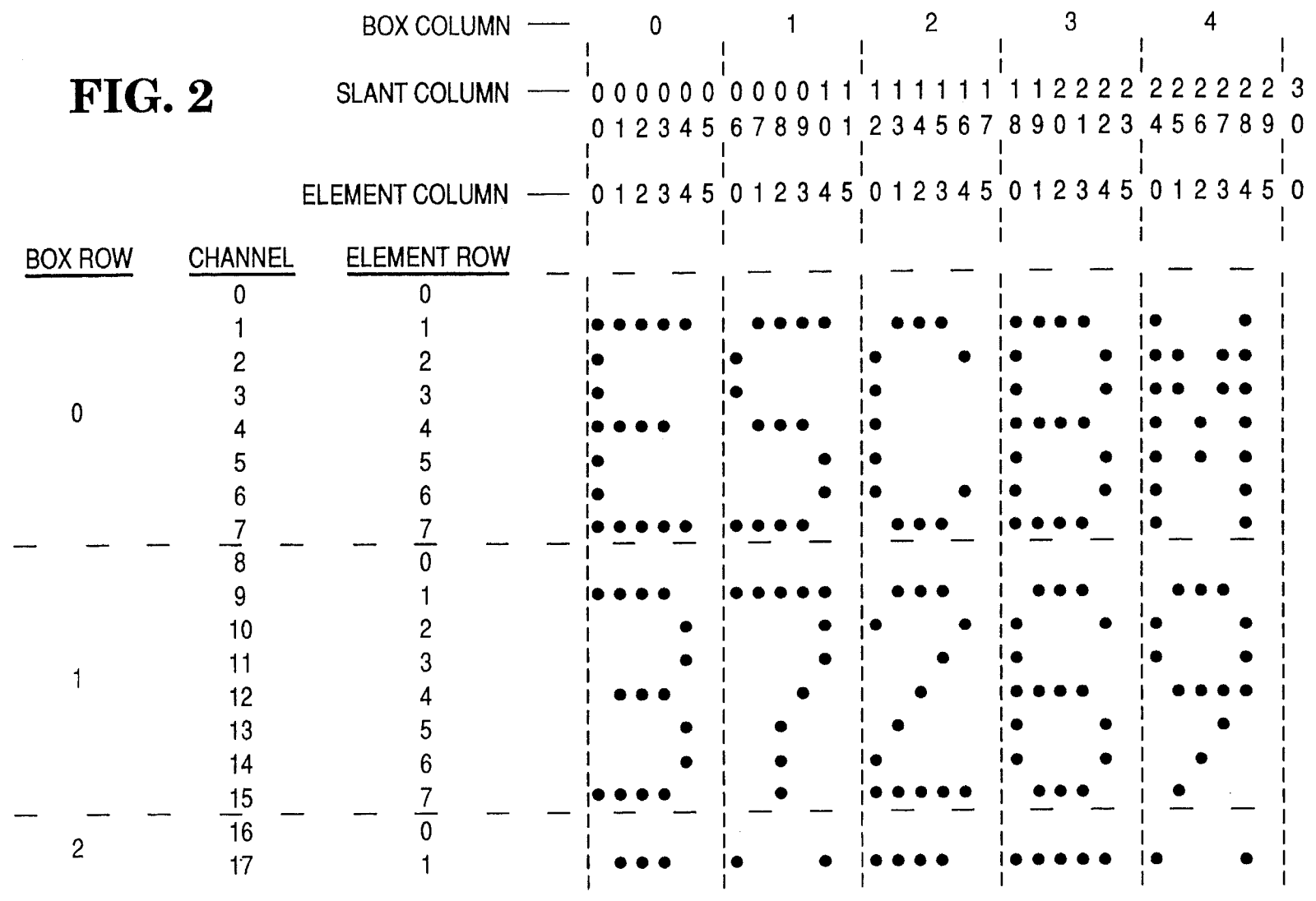

Greater detail concerning the print zone dot matrix is revealed in FIG. 2 which illustrates the character matrix layout for the upper left corner of the sample print zone shown in FIG. 1. Ten character boxes are shown. Each character box consists of a sixty-four dot subset of the print zone matrix, the sixty-four dots being arranged in eight element rows, numbered 0 through 7, and six element columns, numbered 0 through 5. Sample characters are shown within the character boxes.

Document Processing System Overview

Figure 3:
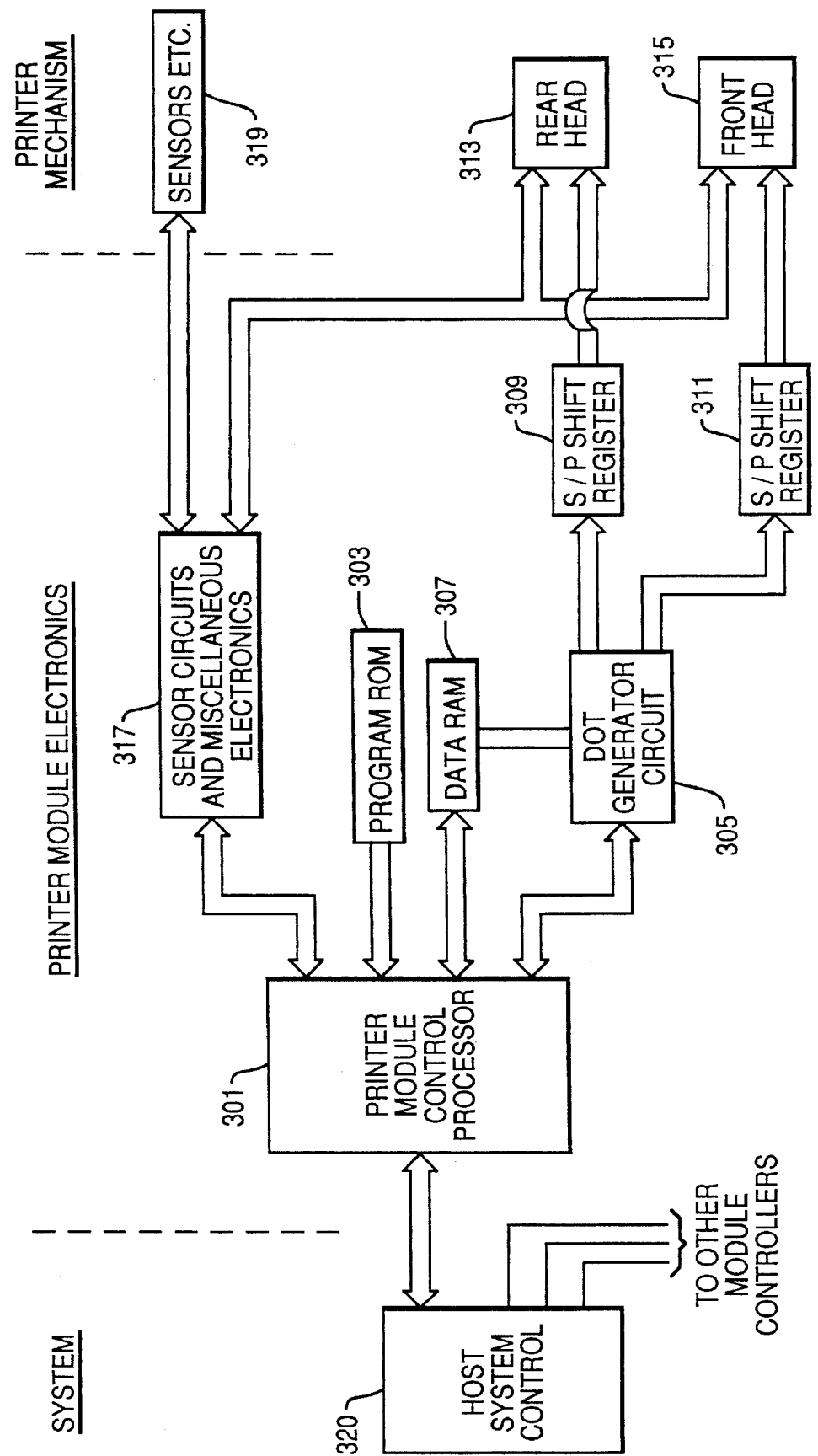
FIG. 3 is a block diagram illustration of a document processing system print module which includes dot generation logic in accordance with the present invention.

A block diagram illustration of a document processing system print module for driving dual multiple-channel slanted printheads 313 and 315 to perform printing within a print zone matrix such as described above is shown in FIG. 3. In addition to the print module, the document processing system includes modules (not shown) for performing such tasks as feeding, reading or storing the documents which pass through the system.

Operation of the print module is governed by a control processor 301 under the direction of firmware read from a program ROM 303. The printer module also includes a data RAM 307, a dot generator circuit 305 in accordance with the present invention, and sensor electronics 317, each of these elements being connected to communicate with control processor 301. Dot state information is provided by dot generator circuit 305 through serial-to-parallel shift registers 309 and 311 to print heads 313 and 315, respectively.

During printing operations a continuous stream of documents is fed past the printer at a nominal speed of 2640 mm/sec. for one-pass printing. For each document the host system controller 320 sends print data to print module controller 301 which buffers the data into RAM 307. That data is then available for use by dot generator 305 which shares RAM 307.

A command from module controller 301 starts operation of dot generator 305. For each print head and each channel of the print head the dot generator determines the dot state pattern to be printed for the current slant column. The dot generator then loads that pattern into the serial-to-parallel shift register which controls the print head driver.

There are four major steps in document printing:

(1.) The host system sends ASCII characters to the print module. It also specifies whether the characters are for the front or rear head.

(2.) Print module controller 301 buffers the data to be printed into the appropriate area of RAM 307 based on the front/rear message from the host system.

(3.) For both the front and rear print heads, module controller 301 monitors document movement and waits until it detects the position of the first slant column to be printed for the respective head.

(4.) For each horizontal increment of the document, (e.g. every 0.47 mm (1/54"), or 178 microseconds at 104 ips) the print module processor utilizes dot generator logic 305 to load the print head with a pattern of 32 channel states. This step is discussed in greater detail below.

If both a front and a rear head are present, the module controller initiates two separate dot generating sequences, (with different slant column numbers) for the front and rear heads within the 178 microsecond period. For a rear printer, the left edge of the print zone arrives first, and thus printing starts with slant column 0. For a front printer, since the right end of the print zone arrives first, the highest numbered slant column is printed first.

Dot Generator Circuit Hardware

Figure 4:
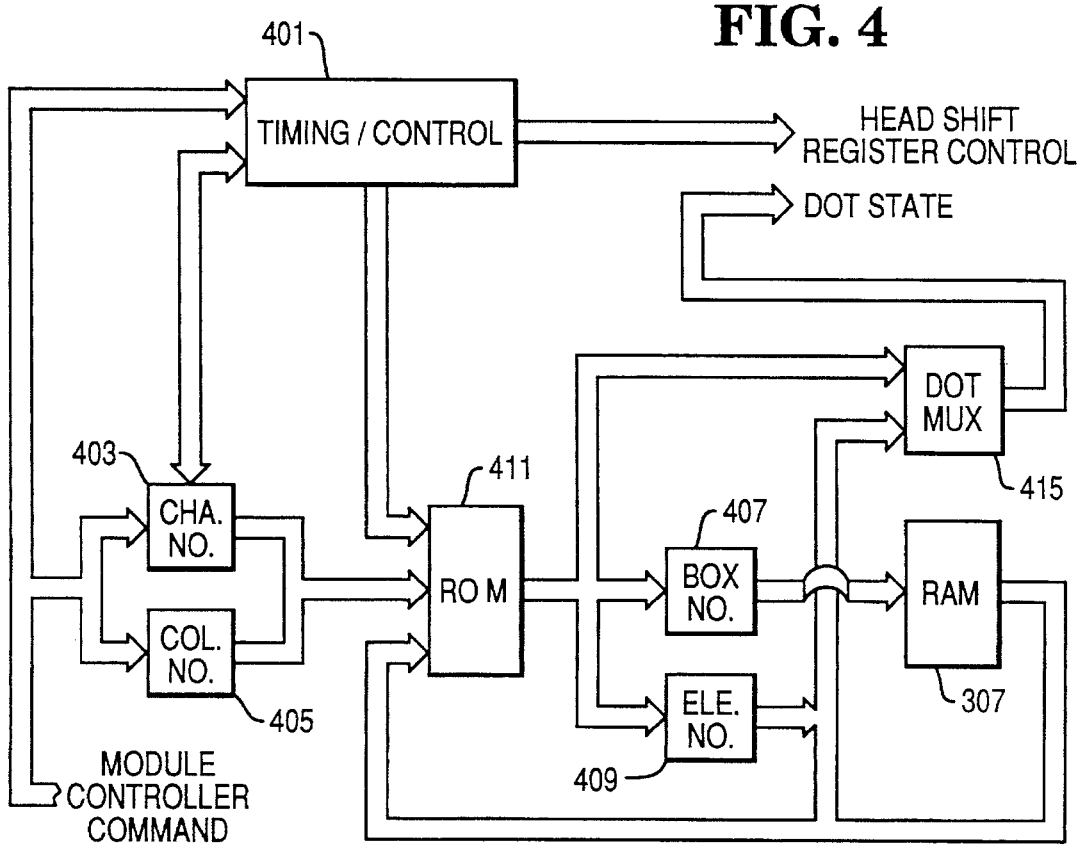
FIG. 4 is a hardware block diagram of the dot generation logic shown in FIG. 3.

FIG. 4 is a hardware block diagram of the logic included within dot generator circuit 305. Dot generator circuit 305 includes a timing/control logic block 401, channel number counter logic block 403 and a column number register 405, each connected to receive data and control information from the print module control processor. The dot generator circuit further includes box number and element number registers 407 and 409, respectively, connected to receive data provided by read only memory 411. RAM 307 and a multiplexer 415 connected to receive data from register 409, ROM 411 and RAM 307 are also shown in FIG. 4. A schematic diagram of the logic included in dot generator circuit 305 is shown in FIGS. 5A through 5P.

The contents of box number register 407 are utilized to address RAM 307; while information provided by timing/control logic 401, counter 403, registers 405 and 409, and RAM 307 is used to address ROM 411.

Figure 5A:
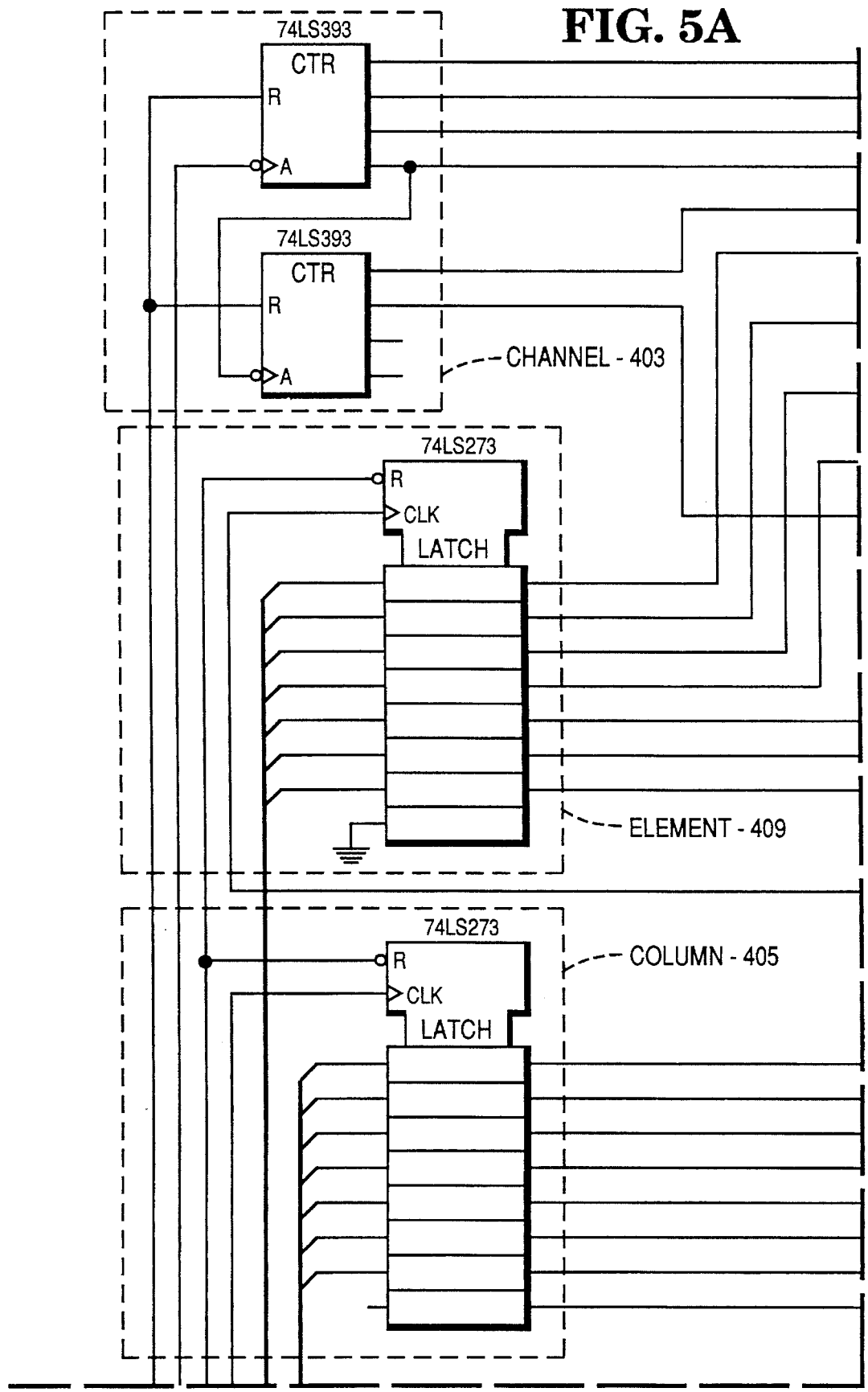
FIGS. 5A through 5P provide a schematic diagram of the dot generation logic of the present invention, shown in block diagram form in FIG. 3.
Figure 5B:
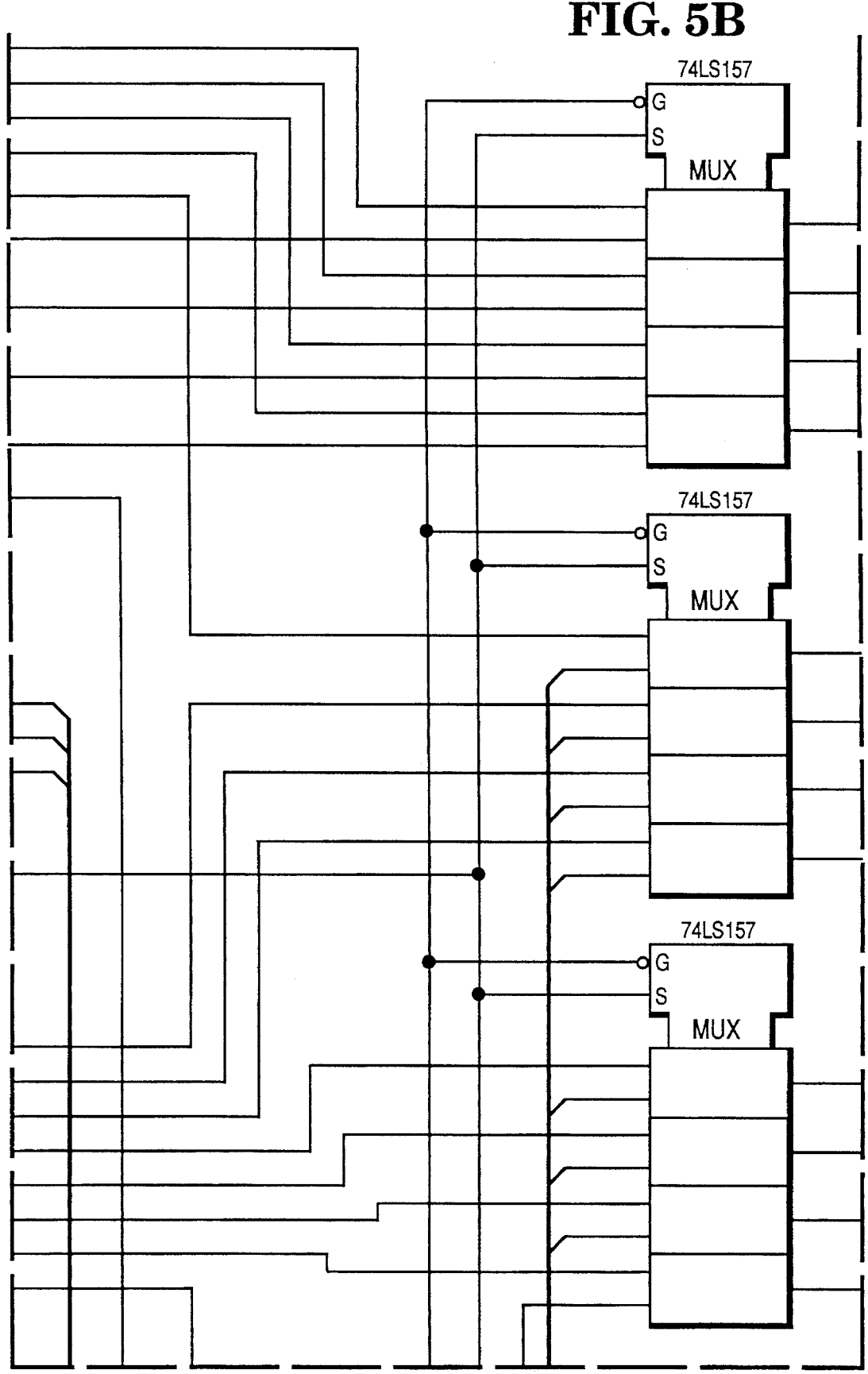
Figure 5C:
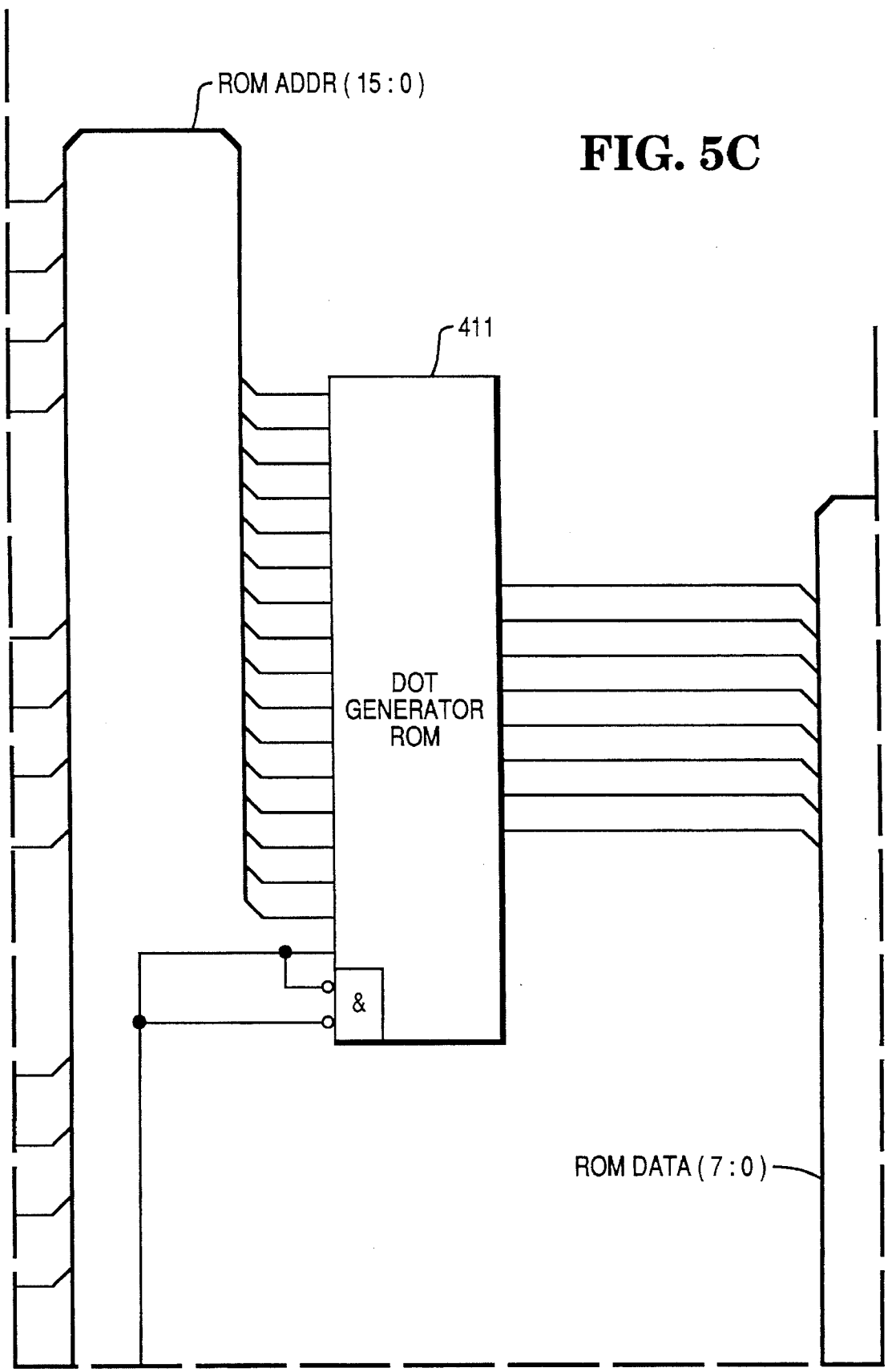
Figure 5D:
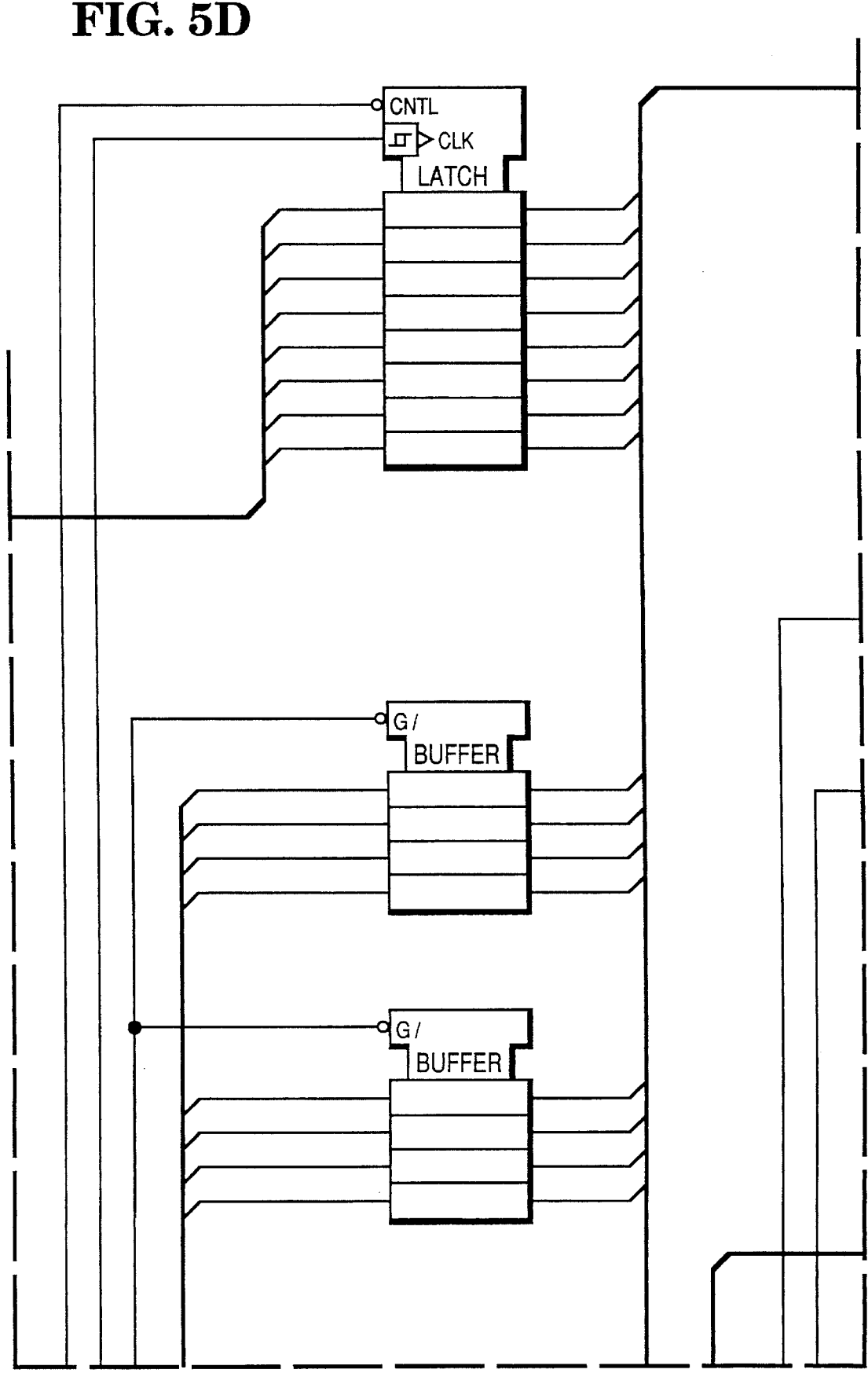
Figure 5E:
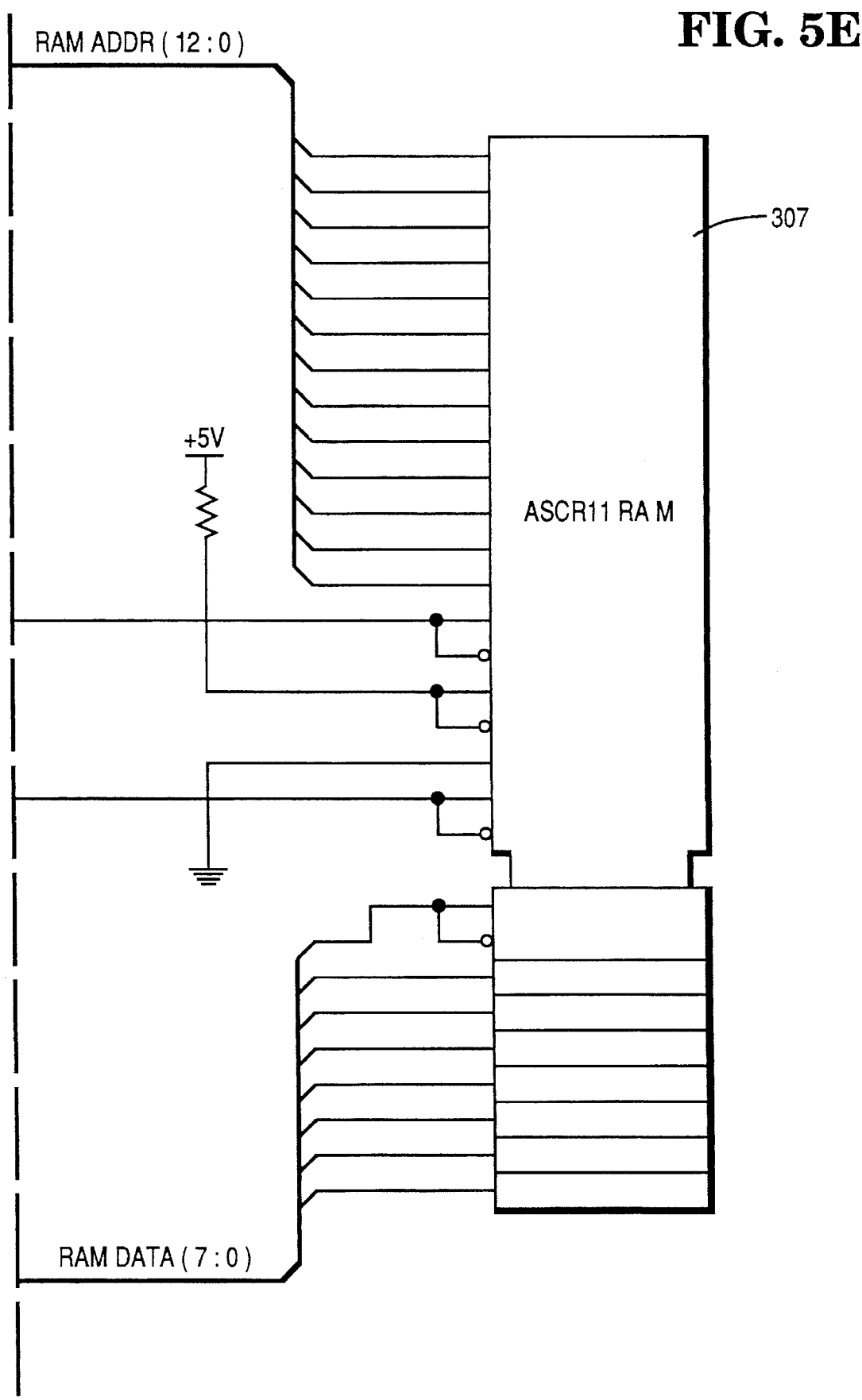
Figure 5F:
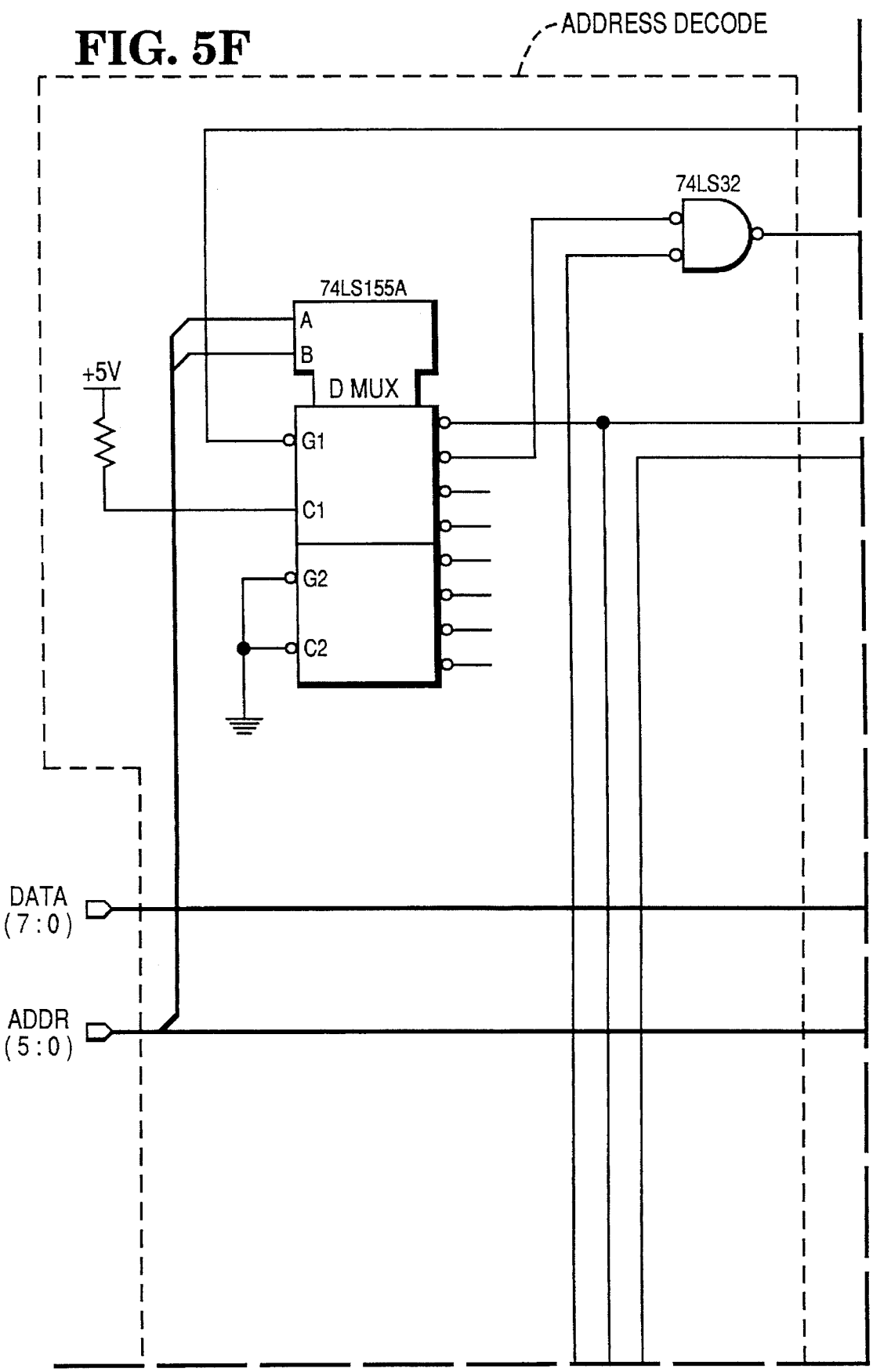
Figure 5G:
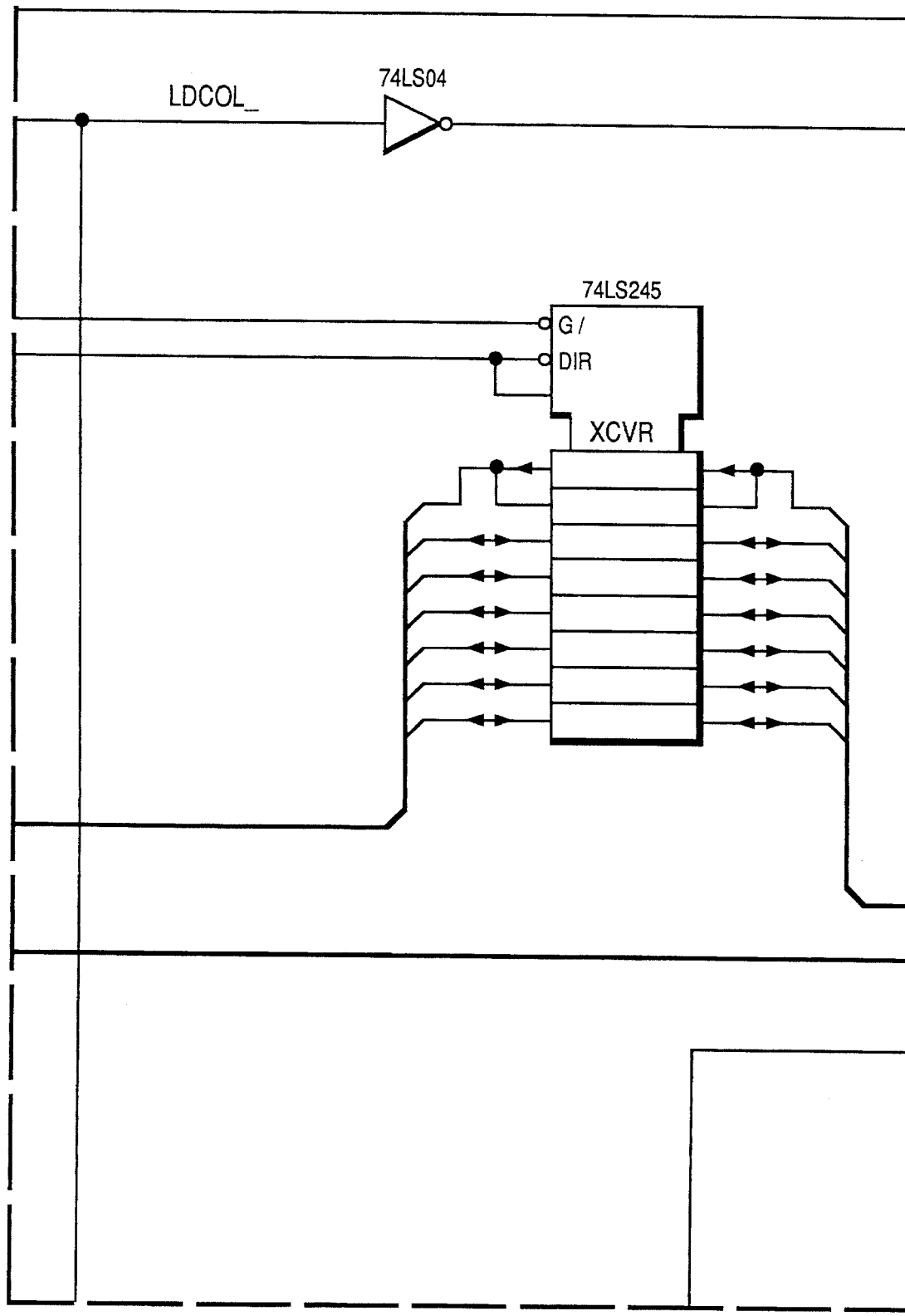
Figure 5H:
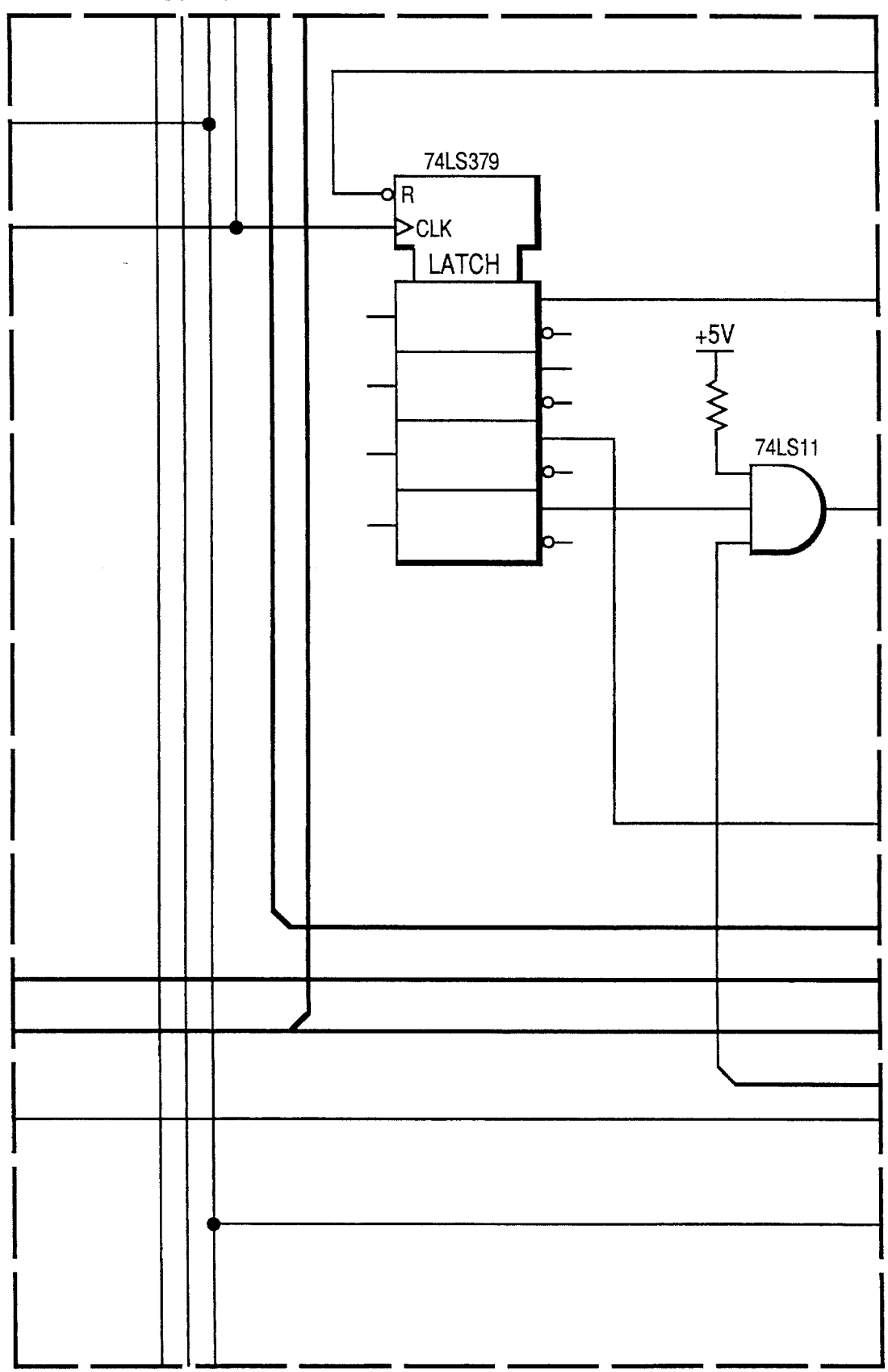
Figure 5I:
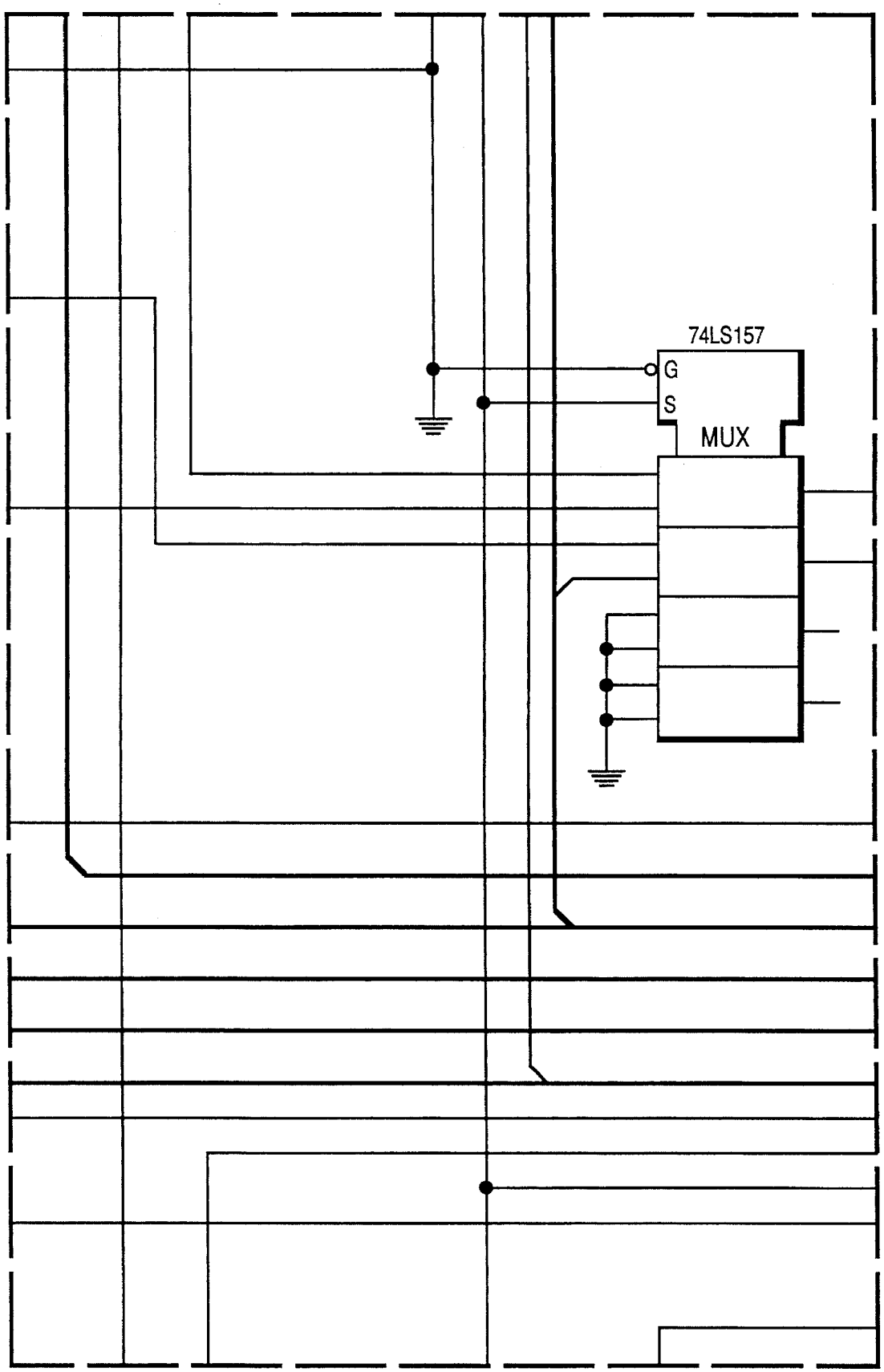
Figure 5J:
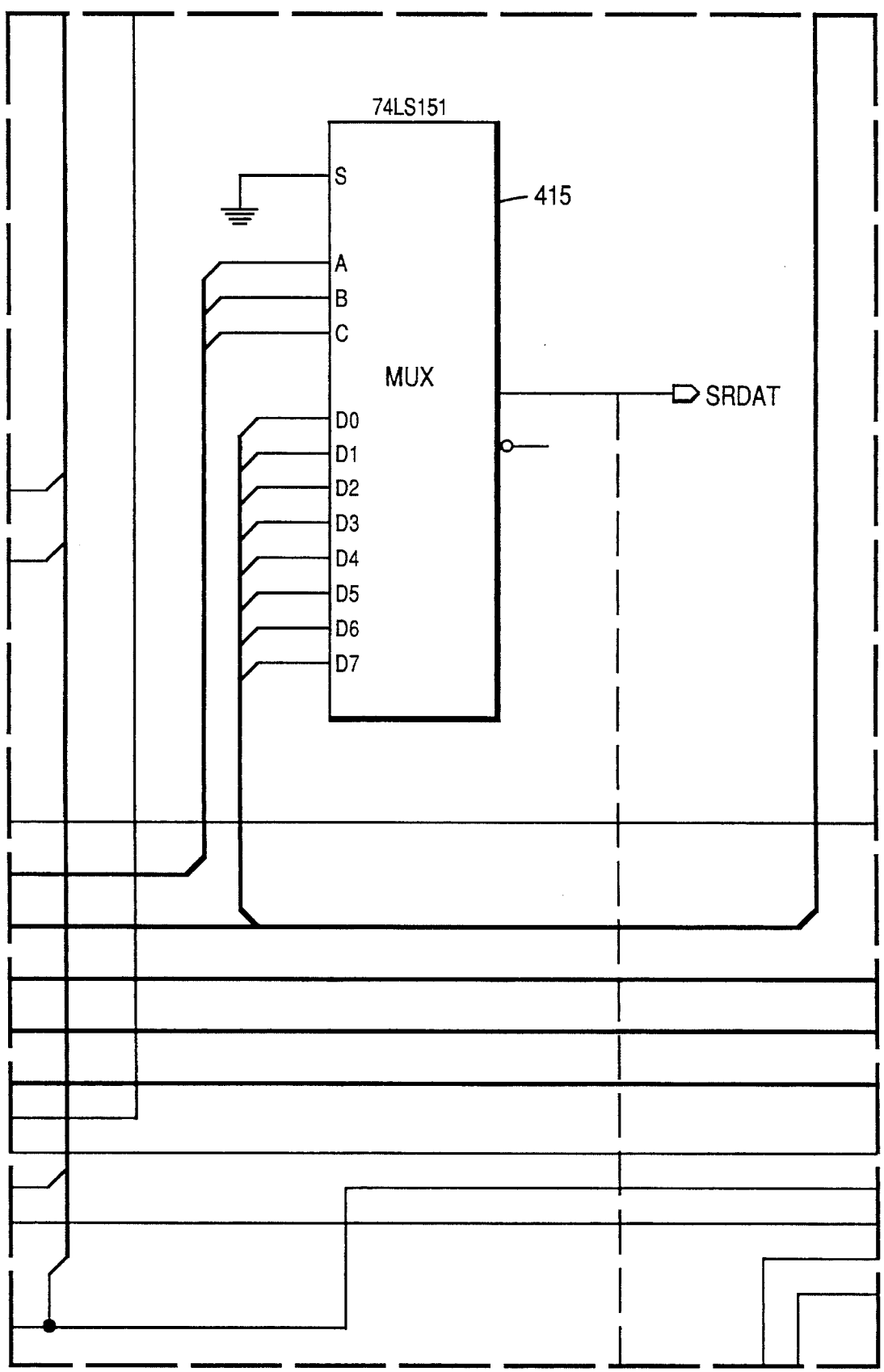
Figure 5K:
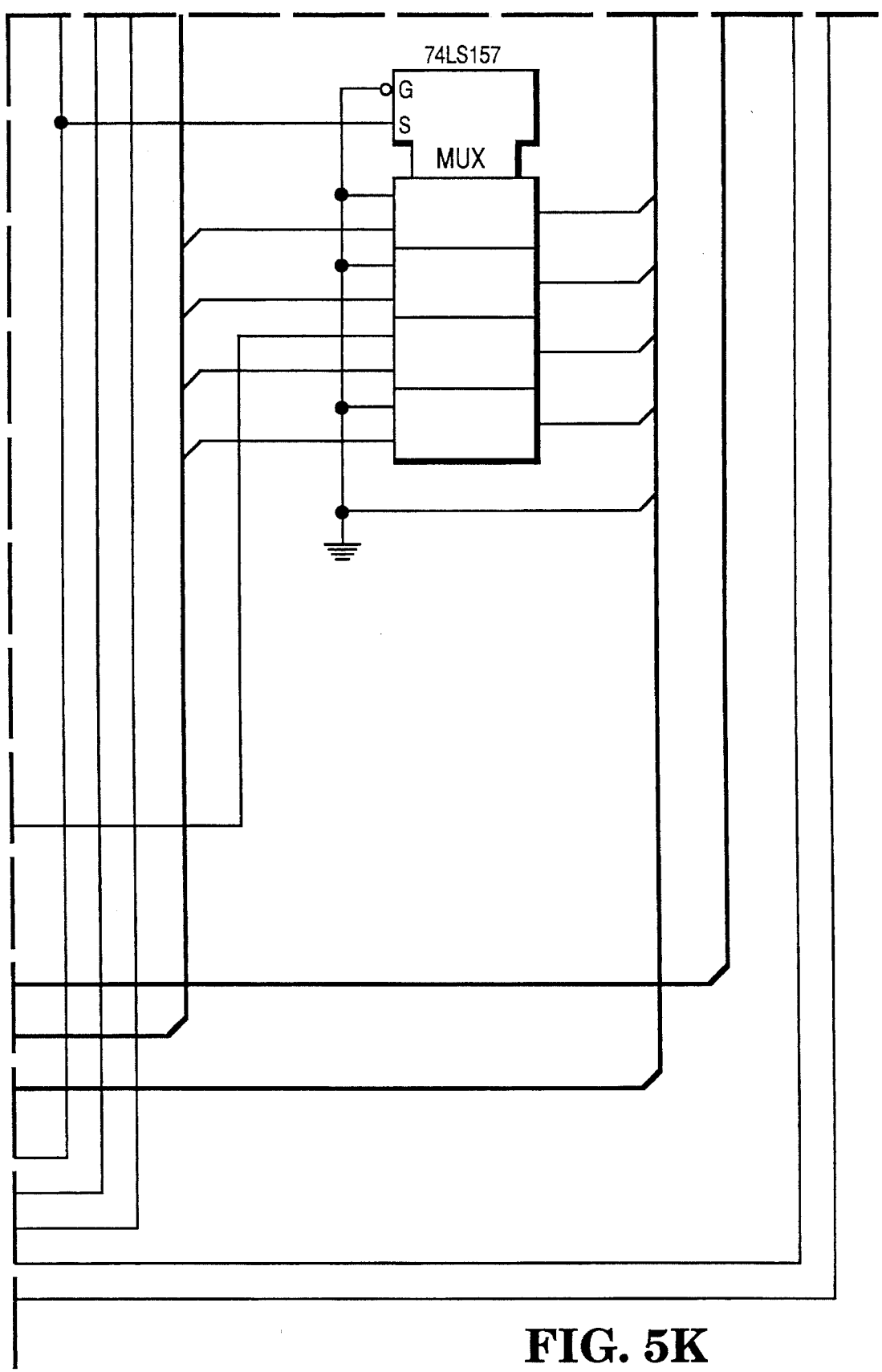
Figure 5M:
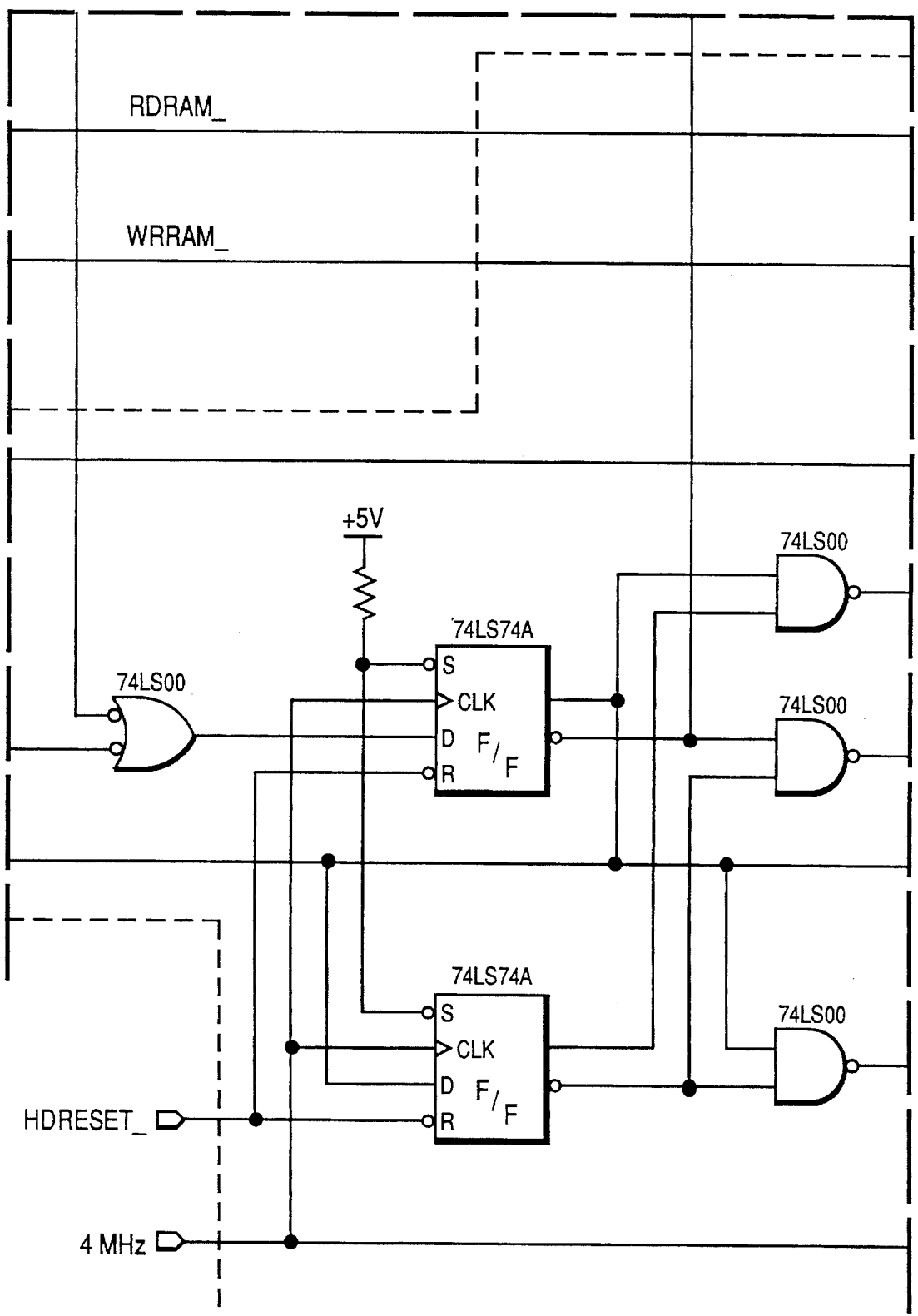
Figure 5N:
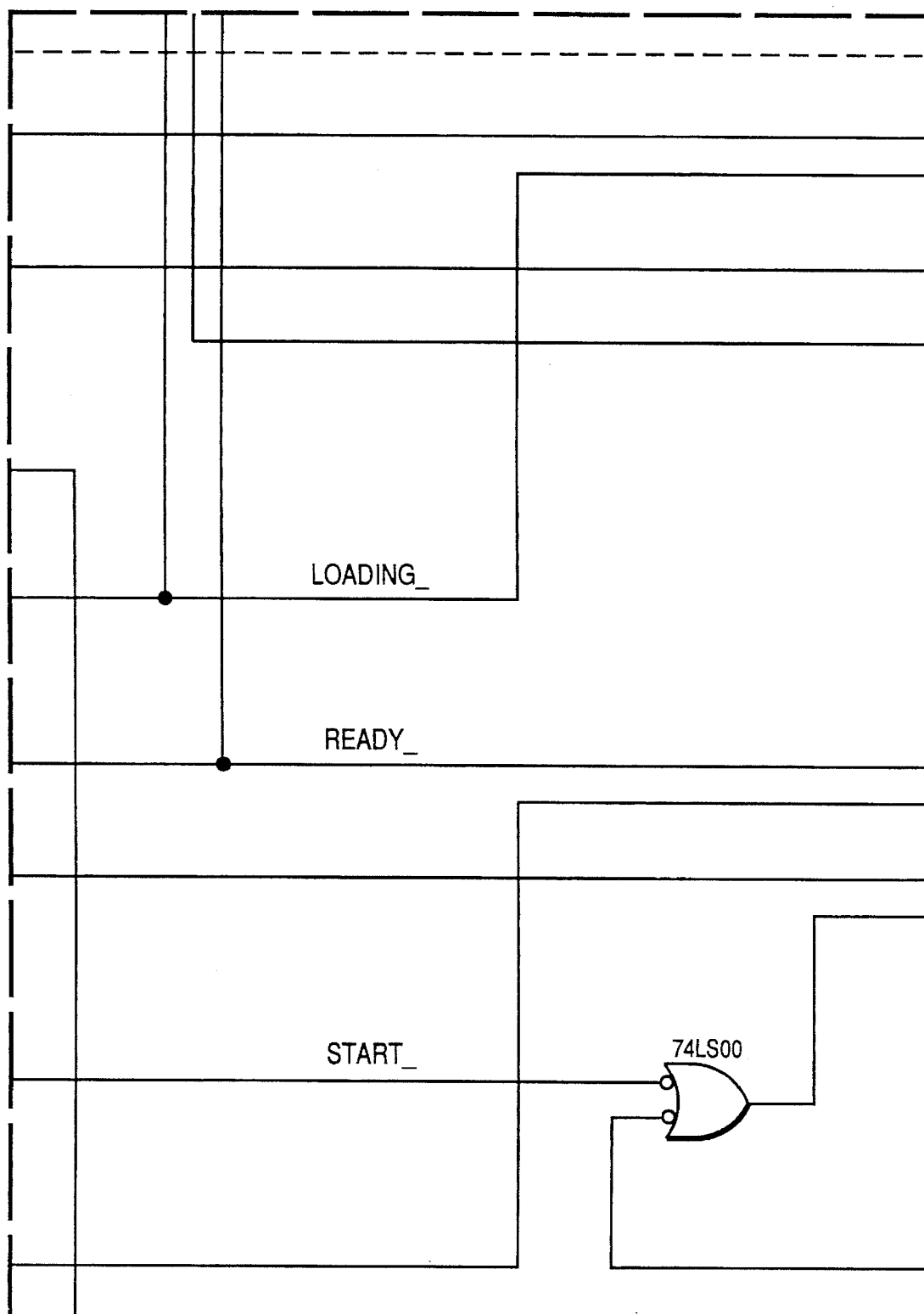
Figure 5O:
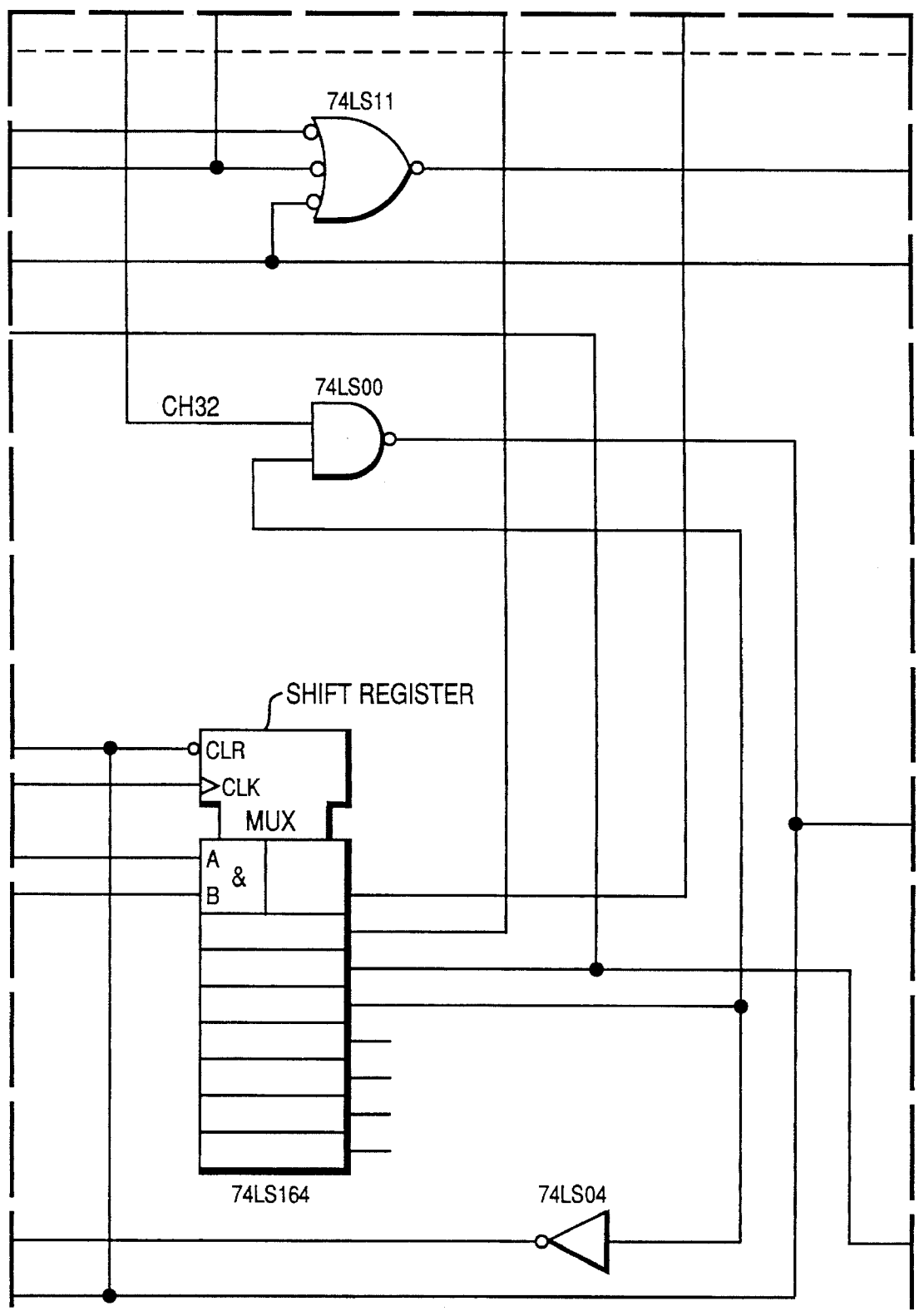
Figure 5P:
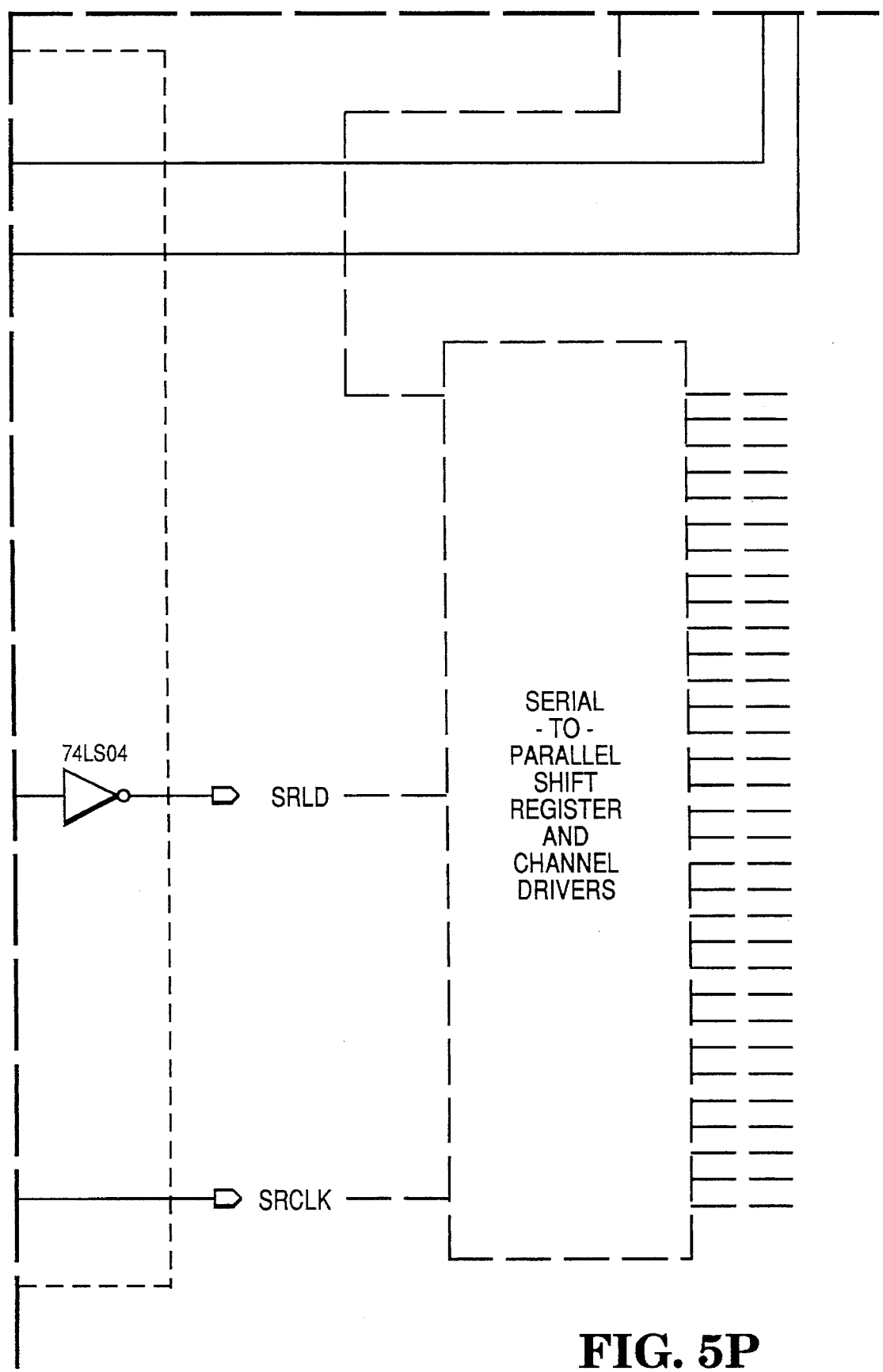

FIGS. 5A through 5P provide a schematic diagram of the dot generation logic of the present invention, shown in block diagram form in FIG. 4. The circuitry is implemented in low power Schottky TTL logic, although the circuitry may be constructed in technology other than low power Schottky TTL. Logic elements shown are labeled with appropriate TTL alphanumeric designations. The construction and operation of the logic should be readily apparent to those skilled in the art.

Dot Generator Circuit Operation

Referring to FIGS. 3, 4 and 5A through 5P, the process executed by dot generator circuit 305 to determine dot states for print head 313 will now be explained. Upon receiving a command from module controller 301, the dot generator finds dot states for the print head's 32 channels so that the head can be "fired" with a correct pattern. This process is requested by the module controller each time the document has horizontally moved another dot position past the print head. A step-by-step description of the print head dot state generation process now follows:

(1.) Print module controller 301 writes a command to dot generator 305 containing:
   SLANT COLUMN#;
   front or rear image selection; and
   SHIFT bit.
The WRITE pulse transferring this information:
   turns OFF the READY status line to module controller 301;
   disables module controller 301 from accessing data RAM 307;
   initializes CHANNEL# counter 403 to zero; and
   initializes timing/control logic 401 to phase T0.
The dot generator then performs the following sequence for each dot (channels 0 through 31).

(2.) Timing/control logic 301, being at phase T0, creates a ROM address "offset" to point to ROM 411's BOX# area.
   A BOX# fetch address is generated by combining the SLANT COLUMN#+CHANNEL#+offset to create a full ROM address. The quantity SLANT COLUMN#+CHANNEL# was defined earlier as DOT#.

(3.) The ASCII# is fetched from RAM 307:
   a. ROM's output—the character BOX#—is temporarily stored;
   b. the stored BOX#, combined with a front/rear selection bit becomes the address for RAM; and
   c. RAM output contains the ASCII character that is to be printed for that BOX.

(4.) An ELEMENT# fetch address is generated by keeping the DOT# unchanged from step 2, setting ROM 411's offset to the ELEMENT# area, and advancing the timing controller to phase T1.

(5.) ROM output is now the ELEMENT#—which is temporarily stored.

(6.) A DOT STATE fetch address is generated by using ELEMENT#+ASCII#(from step 3c)+offset pointing to ROM 411's dot state area.
Timing/control logic 401 advances to phase T2.

(7.) ROM 411 output is now a byte of dot printing (ON/OFF) states.

(8.) The desired bit is selected from the ROM output byte by multiplexer 415 which is controlled by part of the ELEMENT#.

(9.) The selected dot state bit is loaded into print head shift register 309 with signals from the timing/control circuit.

(10.) Timing/control logic 401 then increments the CHANNEL#, and the next dot calculation begins (starting at step 2).

(11.) After all 32 dots have been calculated, CHANNEL# counter 403 starts to shut down the timing controller, causing it to generate a pulse to transfer the 32 dot states in the shift register 309 to a parallel output to print head 313.

(12.) The READY status line to the module controller then goes TRUE and RAM is available again for access by the module controller.

The module controller completes the head firing sequence after step 12. It gates the parallel output registers to the head's channel drive circuits and generates the appropriate firing pulse.

Figure 6:
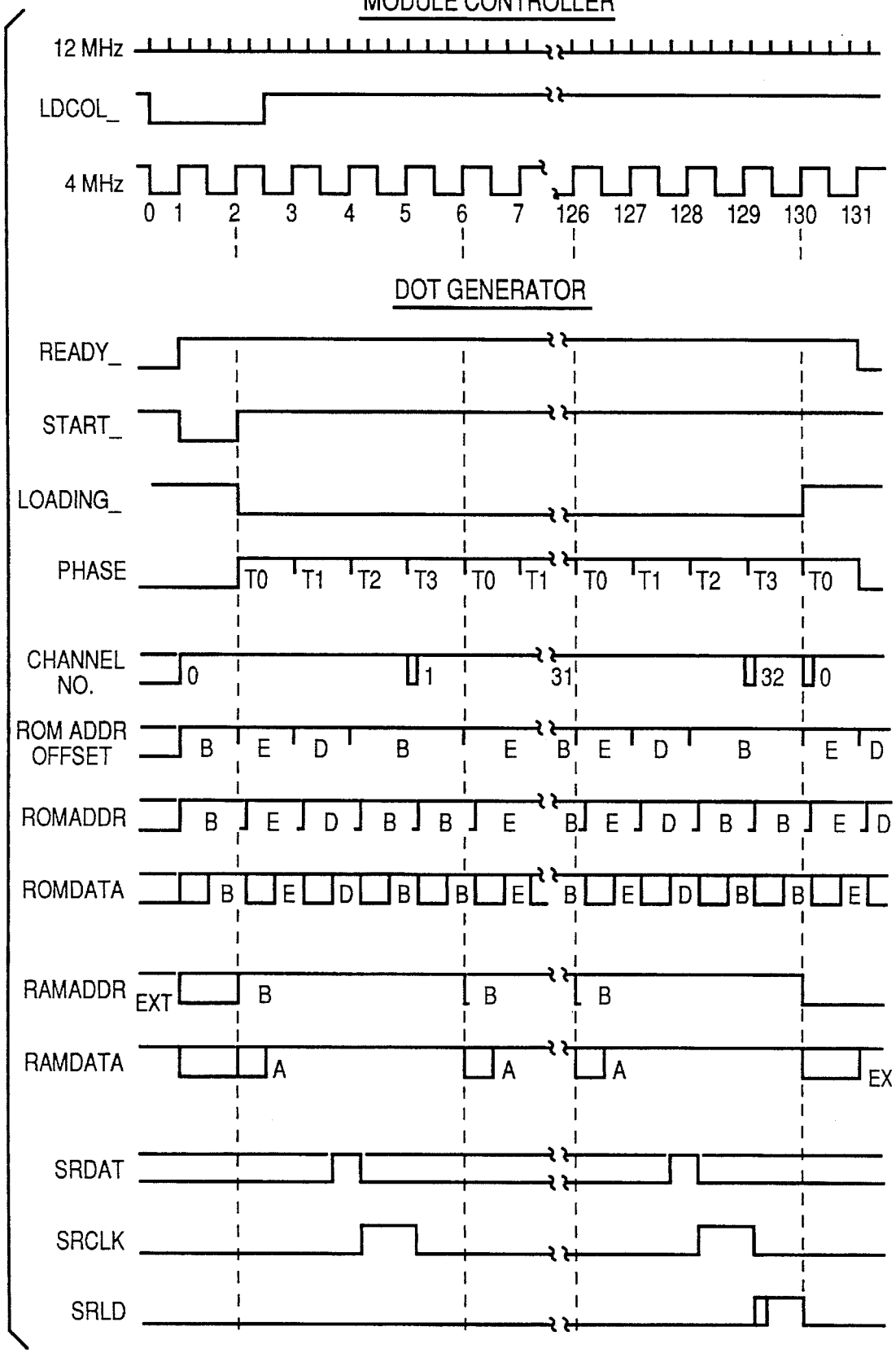
FIG. 6 is a timing diagram illustrating the sequence employed by the dot generation logic for generating printhead dot states in accordance with the present invention.

The above-described sequence employed by the dot generation logic for generating printhead dot states in accordance with the present invention is illustrated in the timing diagram of FIG. 6. Characters "B", "E" and "D" for the signals ROM ADDRESS OFFSET, ROMADDR, ROMDATA and RAMADDR refer to BOX#, ELEMENT# and DOT STATE, respectively.

The above process as implemented in the hardware shown in FIGS. 4 and 5A through 5P requires 32 microseconds to load print head 313. 146 microseconds remain between dot firings for other processor activity such as running the dot generator a second time to load print head 315.

Additional detail concerning the dot generator circuit operation, memory mapping and ROM look-up address generation is provided in the ensuing section, titled "ROM and RAM Memory Maps and Address Generation", and the example dot calculation which follows.

ROM and RAM Memory Maps and Address Generation

I. Module Controller Memory Map

Dot generator 305 is seen by module controller 301 mapped into its external memory space as follows:

TABLE 1

| Module Controller Memory Map | |
|---|---|
| FFFF A000 | uncommitted |
| 9FFF 8000 | ASCII Data RAM (shared between module controller and dot generator) |
| 7FFF 0000 | Dot Generator - Column/Control Address |

II. Column/control Address

Module controller 301 requests a column of dots for a specific print head from dot generator 305 by writing to the "column/control" address. For rapid data transfer the address pattern—not the written byte—conveys the control information.

The print module controller sets up the address bits in its firmware, and then writes to that address.

| Address Bit | Source |
|---|---|
| A0–A8 | SLANT COLUMN Number (C) |
| A9 | unassigned |
| A10 | REAR/FRONT image (R)(0/1) |
| A11 | NORMAL/SHIFTED print (N)(1/0) |
| A12,13 | not used |
| A14 | 1 ⎫ (COL./CONTROL - RAM offset) |
| A15 | 0 ⎭ |

```
A15      11  9 8                  A0
[0|1|x|x|N|R|—|C|C|C|C|C|C|C|C|C]
```

III. Memory Fetches

A. Address Offsets (ROM)

The timing/control circuit in the dot generator creates four "phase" signals T0, T1, T2, T3, to control the memory fetch sequence. Of these T0 and T1 set ROM address bits A14 and A15 to create address offsets which select the ROM's DOT#, ELEMENT# and DOT STATE areas.

| Phase | A15 | A14 | ROM block |
|---|---|---|---|
| 0 | 0 | 1 | ELEMENT # |
| 1 | 1 | 0 | DOT STATE |
| 2 | 0 | 0 | BOX # |
| 3 | 0 | 0 | BOX # |

B. DOT Number

The dot number (DOT#) is composed of the SLANT COLUMN Number and the CHANNEL Number. It represents the sequential number uniquely describing each dot location on the document.

GENERATION:

| Address Bit | Source |
|---|---|
| A0–A4 | print head channel number (C) |
| A5–A13 | slant column number (S) |

```
A13                              A0
[S|S|S|S|S|S|S|S|S|C|C|C|C|C]
```

C. BOX Number (ROM)

The example document grid has 4 character rows (8 channels per character, 32 channel head) of up to 64 character columns. This gives printable grid locations or boxes.

The columns are numbered 0 to 63 from left to right when viewing the printed document. The rows are numbered 0 to 3 from top to bottom.

ROM's BOX number area defines within which character box a specified dot falls.

ADDRESS GENERATION:

| Address Bit | Source |
|---|---|
| A0–A4 | channel number (C) ⎫ (= DOT#) |
| A5–A13 | slant column number (S) ⎭ |
| A14 | 0 ⎫ (BOX# offset - 16K block) |
| A15 | 0 ⎭ |

```
A15                                    A0
[0|0|S|S|S|S|S|S|S|S|S|N|N|N|N|N]
```

TIMING:
Address true:—generator initialization til T0 start—T2, T3 phase
Data clocked at: T0 lead edge

BYTE CONTENTS (BOX#):

| Address Bit | Function |
|---|---|
| B0–B5 | character column on document (C) |
| B6,7 | character row on document (R) |

```
  7            0
[R|C|C|C|C|C|C]
```

D. ASCII Number (RAM)

As soon as the BOX# is fetched, it becomes the main part of the RAM address. After being combined with the control bit specifying the front or rear of the document the ASCII character for that box can be fetched from RAM.

ADDRESS GENERATION:

| Address Bit | Source |
|---|---|
| A0–A7 | BOX number (B) |
| A9 | REAR/FRONT select (R)(0/1) |
| A8,10,11 | 0 |

```
A11     9   7                    A0
[0|0|R|0|B|B|B|B|B|B|B|B]
```

TIMING:
Address true:—updated at T0 lead edge—remains true for all T0–T3
Data used: during T1

BYTE CONTENTS (ASCII#):

| Address Bit | Function |
|---|---|
| B0–B6 | basic character code (C) |
| B7 | normal/large size flag (S)(0/1) |

```
 7                 0
|S|C|C|C|C|C|C|C|
```

E. ELEMENT Number (ROM)

ROM also describes where each dot is relatively located within a character box.

ADDRESS GENERATION:

| Address Bit | Source |
|---|---|
| A0–A5 | channel number (N) |
| A6–A13 | slant column number (S) |
| A14 | 1 } (ELEMENT# offset - 16K block) |
| A15 | 0 |

```
A15                                A0
|0|1|S|S|S|S|S|S|S|S|N|N|N|N|N|N|
```

TIMING:
 Address true: T0 phase
 Data clocked at: T1 lead edge

BYTE CONTENTS (ELEMENT#):

| Address Bit | Function |
|---|---|
| B0–B3 | element row within character box (R) |
| B4–B6 | element column within character box (C) |
| B7 | don't care |

```
 7                 0
|–|C|C|C|R|R|R|R|
```

F. DOT State (ROM)
ADDRESS GENERATION:

| Address Line | Source |
|---|---|
| A0–A3 | ELEMENT number B0–B3 (element row)(E) |
| A4–A10 | ASCII code A0–A6 (A) |
| A11,12 | BOX # B0,6 (quadrant of 2× size char.)(B) |
| A13 | ASCII code A7 (normal/2× size bit)(A) |
| A14 | 0 } (DOT STATE offset - 16K block) |
| A15 | 1 |

```
A15                                A0
|1|0|A|B|B|A|A|A|A|A|A|E|E|E|E|
```

TIMING:
 Address true: T1 phase
 Data clocked at: T2 lead edge

BYTE CONTENTS (DOT STATE):

The STATE byte contains the printing states for all dots of the whole element row in which the dot being calculated is contained. So, D0–D7 contain the states of element columns 0–7, respectively. The required bit is multiplexer-selected from this byte, controlled by the three column bits from ELEMENT#.

TABLE 2

ROM Map

```
D7              D0
|D|D|D|D|D|D|D|D|
```

IV. ROM Map

| | | | |
|---|---|---|---|
| FFFF | | | UNUSED |
| C000 | | | |
| BFFF | lower right | double size | CHARACTER |
| B800 | quadrant | characters | DOT STATE |
| B7FF | lower left | | BIT MAPS |
| B000 | quadrant | | (offset 8000H) |
| AFFF | upper right | | |
| A800 | quadrant | | |
| A7FF | upperleft | | |
| A000 | quadrant | | |
| 9FFF | 1 of 4 | normal size | |
| 9800 | duplicates | characters | |
| 97FF | 1 of 4 | | |
| 9000 | duplicates | | |
| 8FFF | 1 of 4 | | |
| 9000 | duplicates | | |
| 87FF | 1 of 4 | | |
| 8000 | duplicates | | |
| 7FFF | | | ELEMENT |
| 4000 | | | (offset 4000H) |
| 3FFF | | | BOX # |
| 0000 | | | (offset 0000H) |

V. ASCII RAM Map

TABLE 3

RAM MAP

| | | |
|---|---|---|
| 1FFF | module controller | |
| 0600 | general use | |
| 05FF | "Live" Printing Buffer | FRONT PRINTER |
| 0400 | | |
| 03FF | module controller | |
| 0200 | general use | |
| 01FF | "Live" Printing Buffer | REAR PRINTER |
| 0000 | | |

Example Dot Calculation

Figure 8:
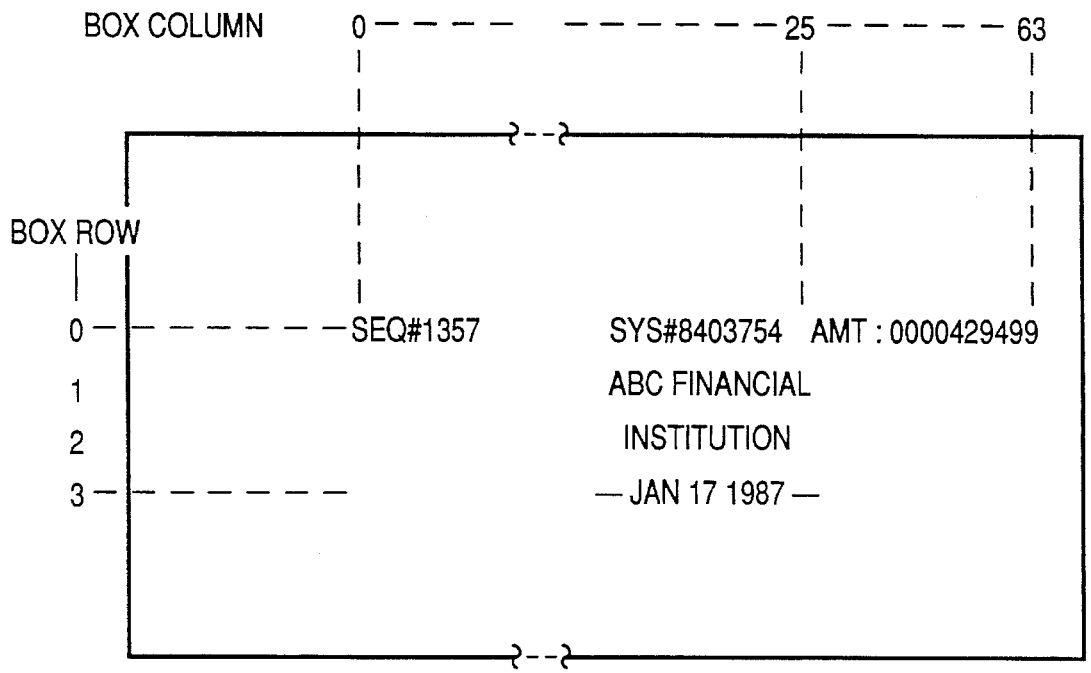
FIG. 8 provides example document content for the sample print zone shown in FIG. 1.

FIGS. 7 and 8 provide example document content for the sample print zone shown in FIG. 1. Box Columns 25, 26 and 27 of Box Row 0 are shown in FIG. 7. Each dot location within the print zone is identified by a unique number defining that location within the print zone. The example which follows explains the calculation of the ON/OFF state for dot location number 5,284. Dot location 5,284 is seen to be in CHANNEL# 4 (the 5th element down from the print zone top) in slant COLUMN# 165 (the 166th from the print zone left edge), in the character box at box column 25 and box row 0. In FIG. 8 it is seen that the character box at box column 25 and box row 0 contains a space character.

As discussed above, ROM and RAM addresses are composed of an offset from the generator's timing/control circuit added to the other bits as follows:

| Phase | Fetch | Memory | Address (Offset) + Other |
|---|---|---|---|
| T0 | BOX # | ROM | (0) + 32 × COLUMN # + CHANNEL # |
| T1 | ASCII # | RAM | (0 or 512 for front/rear) + BOX # |

-continued

| Phase | Fetch | Memory | Address (Offset) + Other |
|---|---|---|---|
| T1 | ELEMENT # | ROM | (16,384) + 32 × COLUMN # + CHANNEL # |
| T2 | DOT STATE | ROM | (32,768) + 32 × ASCII # + ELEMENT # (NOTE: this is a simplified formula, which does not account for large character mode) |

DOT#, BOX# and ELEMENT# are determined through the following equations:

$$DOT\# = 32 \times (SLANT\ COLUMN\# = CHANNEL\#)$$

$$BOX\# = 64 \times (doc.\ grid\ row\#) + (doc.\ grid\ column\#)$$

$$ELEMENT\# = 16 \times (char.\ matrix\ row\#) + (char.\ matrix\ col\#)$$

When the state for dot number 5,284 is calculated, four previous dots have already been calculated, i.e., for channels 0, 1, 2, and 3. At this point CHANNEL#=4. Determination of the dot state for dot number 5,284 proceeds as follows.

1. The BOX# fetch operation, concluded prior to phase 0, the ROM address is determined as (0+165×32+4)=5,284. The ROM's output is the BOX# which in this example equals 25.
2. The ASCII# fetch operation, during phase 0, calculates a ROM address of (0+25)=25. An ASCII# value of 32, the ASCII value for a space character, is retrieved from ROM address 25.
3. The ELEMENT# fetch operation, also during phase 0, calculates a ROM address of (16,384+165×32+4)=21,668. An ELEMENT# value of 67, (5th element row, 4th element column in the character matrix) is retrieved from ROM address 21,668.
4. The DOT STATE fetch, during phase 1, generates a ROM address of (32,768+32×27+67)=33,699. A DOT STATE byte value=00000000 binary is retrieved from ROM. The retrieved value is the complete fifth row of elements for the ASCII character matrix for a "space".
5. In phase 2, the DOT STATE transfer, a multiplexer selects the desired bit 4 from the DOT STATE byte. The bit selected is controlled by the high order nibble of the ELEMENT//byte which contains 4, thus picking the fifth bit. This bit is 0, which is then loaded into the print head shift register.

Double Size Characters

Figure 9:
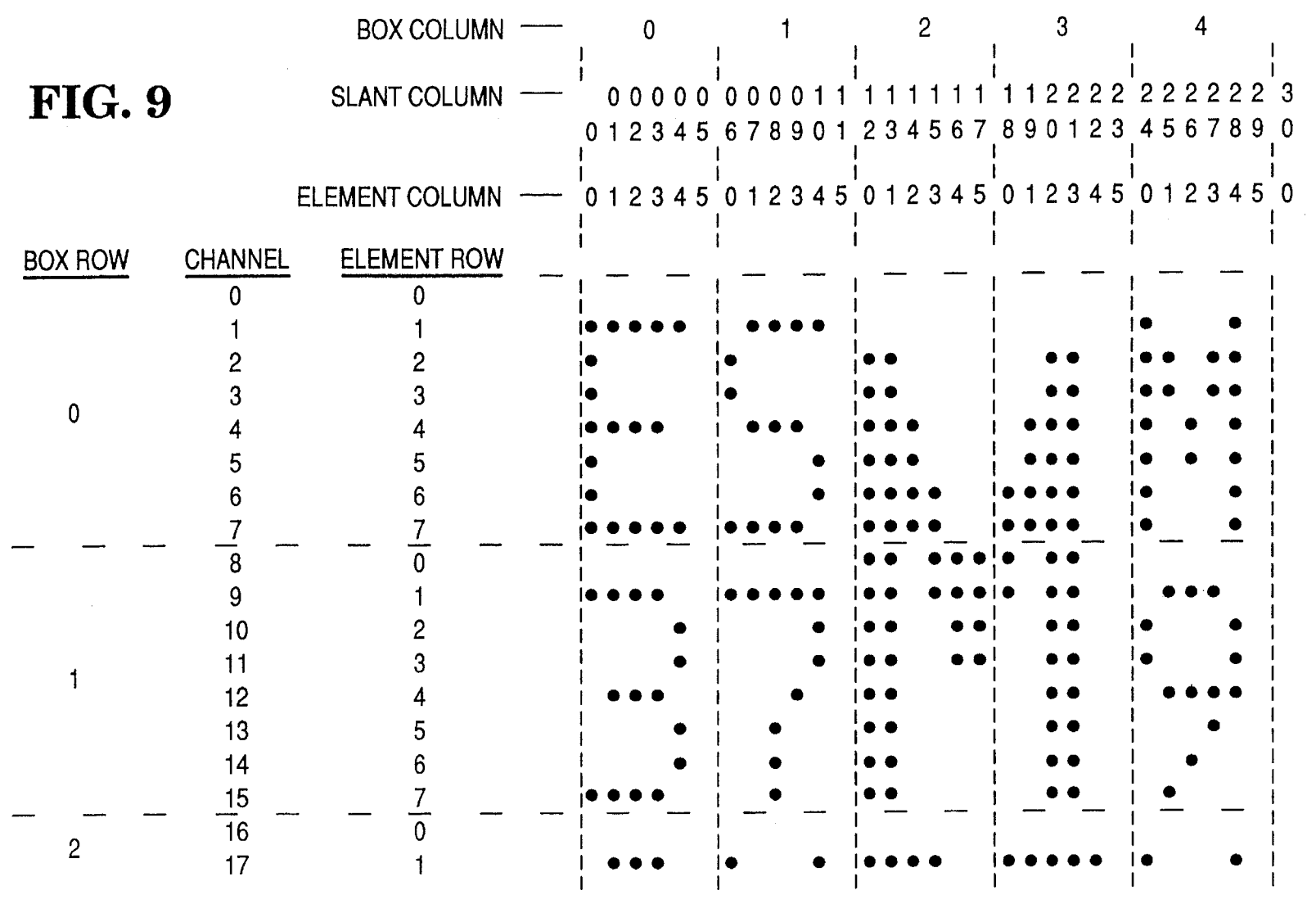

The dot generation logic shown in FIG. 5A through 5P includes logic which allows printing double size characters using a 2×2 array of normal size character boxes. FIG. 9 illustrates single and double-size character matrix layouts for the upper left corner of the sample print zone shown in FIG. 1. The larger character's ASCII code (high order bit set to a one) must already be in RAM in the four character boxes that its four quadrants will occupy (see example below). This method allows mixing normal and double size characters on the same document.

The dot generator circuit, during its ROM lookup for the DOT STATE, uses two bits from the previously fetched BOX number to modify the ROM address. This points to one of four ROM zones containing the large character quadrants' individual maps. (For normal size characters these zones are duplicated bit maps.)

The two bits are used as follows:

| BOX # | BIT | Large character | Quadrant prints in | |
|---|---|---|---|---|
| | | | line #s | column #s |
| 6 | 0 | quadrant | even | even |
| 0 | 0 | left - top | even | even |
| 0 | 1 | right - top | even | odd |
| 1 | 0 | left - bottom | odd | even |
| 1 | 1 | right - bottom | odd | odd |

As implemented, large character printing spans character rows 0, 1 and 2, 3. To enable printing a single large character row spanning lines 1, 2 a circuit controlled by the SHIFT bit in the COLUMN/CONTROL word is included.

When this bit is set to logical (HI) it enables a gate which modifies the ROM address during the DOT STATE fetch. The result is that quadrant fetches for rows 0 and 2 are transposed with 1 and 3. The ASCII buffer must thus contain its duplicated characters in lines 0 and 3, while 2 and 3 must contain spaces.

It can thus be seen that there has been provided by the present invention a method and apparatus which simplifies and accelerates the task of determining dot states for a multiple channel printhead, eliminating the need for multiple microprocessors and intermediate storage memory required to build a complete bit-map image of the print zone before printing begins. Additionally, the method and apparatus provides for the printing of over-sized characters. The method and apparatus are of particular value when applied to a print system including a printhead which spans multiple character rows and columns, such as a diagonal, or slanted, printhead.

Although the presently preferred embodiment of the invention has been described, it will be understood that various changes may be made within the scope of the appended claims.

What is claimed is:

1. In a matrix print system for printing characters within a print zone comprising a plurality of dot print locations, each one of said dot print locations being identified by a unique dot print address, a dot generator for determining dot print ON/OFF states for a multiple channel printhead, comprising:

a first memory for receiving print characters from said print system and storing said received print characters in ASCII format in predetermined character box memory locations within said first memory, each one of said character box memory locations being identified by a unique character box memory address;

a second memory for receiving a dot print address from said print system, said second memory containing an association table correlating each dot print address with one of said character box memory addresses, said second memory being responsive to said received dot print address to provide the character box memory address associated with said received dot print address;

means connected to receive the character box memory address provided by said second memory for extracting from said first memory the ASCII character stored within the received character box memory location identified by the received character box memory address; and a third memory connected to receive the ASCII character extracted from said first memory, said third memory containing dot state ON/OFF values corresponding to each ASCII character, said third memory being responsive to the ASCII character received from said first memory to provide the dot state ON/OFF values corresponding thereto.

2. The dot generator in accordance with claim 1, wherein:

said second and third memories are first and second areas within a read only memory.

3. The dot generator in accordance with claim 1, wherein:

said first memory is a random access memory.

4. In a matrix print system for printing characters within a print zone comprising a plurality of dot print locations, each one of said dot print locations being identified by a unique dot print address, said print zone further comprising a plurality of character box print locations, each one of said character box print locations including an M×N matrix of said dot print locations, wherein M represents the number of rows of said dot print locations within a character box print location and N represents the number of columns of said dot print locations within said character box print location, a dot generator for determining dot print ON/OFF states for a multiple channel printhead, comprising:

a first memory for receiving print characters from said print system and storing said received print characters in ASCII format in predetermined character box memory locations within said first memory, each one of said character box memory locations being identified by a unique character box memory address;

a second memory for receiving a dot print address from said print system, said second memory containing an association table correlating each dot print address with one of said character box memory addresses, said second memory being responsive to said received dot print address to provide the character box memory address associated with said received dot print address;

a third memory for receiving said dot print address from said print system, said third memory containing an association table correlating each dot print address with a character box print location row number and column number, said third memory being responsive to said received dot print address to provide the row number corresponding thereto;

means connected to receive the character box memory address provided by said second memory for extracting from said first memory the ASCII character stored within the received character box memory location identified by the received character box memory address; and a fourth memory connected to receive said row number from said third memory and the ASCII character extracted from said first memory, said fourth memory containing dot state ON/OFF values corresponding to each row of each ASCII character, said fourth memory being responsive to the received row number and ASCII character to provide the dot state ON/OFF values for the dot locations within the character box row of the ASCII character extracted from said first memory identified by said received row number; and means connected to receive said column number from said third memory and the dot state ON/OFF values from said fourth memory for selecting from the received dot state ON/OFF values the dot state values for said received column number.

5. The dot generator according to claim 4, wherein:

said M×N matrix of said dot print locations comprises an 8×6 matrix of said dot print locations.

6. In a data processing system, a matrix print system for printing characters within a document print zone comprising a plurality of dot print locations, each one of said dot print locations being identified by a unique address, said print zone further comprising a plurality of character box print locations, each one of said character box print locations including an M×N matrix of said dot print locations, wherein M represents the number of rows of said dot print locations and N represents the number of columns of said dot print locations, each one of said dot print locations being identified by a unique dot print address, said print system comprising:

a random access memory (RAM) for receiving print characters from said data processing system and storing said received print characters in ASCII format in predetermined character box memory locations within said random access memory; and a read only memory (ROM) connected to receive a dot print address from said data processing system, said ROM comprising:

a first storage area containing an association table correlating each one of said dot print addresses with one of said character box memory locations within said first memory;

a second storage area containing an association table correlating each one of said dot print addresses with a row number and column number within a character box print location; and a third storage area containing dot state ON/OFF values corresponding to each row of each ASCII character;

wherein:

said ROM is responsive to said received dot print address to provide from said first storage area the character box memory location associated with said received dot print address;

said RAM is connected to receive the character box memory location from said first storage area and responsive thereto to provide the ASCII character stored within the received character box memory location;

said ROM is responsive to said received dot print location to provide from said second storage area the row and column numbers corresponding to said dot print location;

said ROM is connected to receive the ASCII character extracted from said RAM and is responsive to the row number provided from said second storage area and the ASCII character extracted from said RAM to provide from said third storage area the dot state ON/OFF values for the dot locations within the character box row of the ASCII character extracted from said RAM identified by said received row number; and selecting means connected to said ROM to receive the dot state ON/OFF values provided from said third storage area and the column number from said second storage area, said selecting means being responsive thereto to provide the dot state ON/OFF value for said dot print address.

7. The matrix print system according to claim 6, further comprising:

a shift register connected to said selecting means to receive and store the dot state ON/OFF value provided by said selecting means; and a multiple channel printhead connected to said shift register for printing said dot state ON/OFF value stored within said shift register.

8. The matrix print system according to claim 7, wherein:

said shift register accumulates the dot state ON/OFF values for a series of dot print addresses corresponding to the printhead channels at each position of said print head within said print zone.

9. In a matrix print system for printing characters within a print zone comprising a plurality of dot print locations, each one of said dot print locations being identified by a unique dot print address, a method for determining dot print ON/OFF states for a multiple channel printhead, comprising the steps of:

(a) storing print characters received from said print system in ASCII format in predetermined character box memory locations within a first memory, each one of said character box memory locations being identified by a unique character box memory address;

(b) storing an association table within a second memory, said association table correlating each one of said dot print addresses with one of said character box memory addresses;

(c) storing dot state ON/OFF values corresponding to each ASCII character within a third memory;

(d) generating a series of dot print addresses corresponding to the printhead channels at each position of said print head within said print zone;

(e) retrieving the character box address associated with each one of said dot print addresses within said series from said second memory;

(f) retrieving the ASCII character stored within the retrieved character box memory location identified by said character box address provided by step (e); and (g) retrieving the dot state ON/OFF value corresponding to the retrieved ASCII character provided by step (f).

10. The method according to claim 9, further including the steps of:

(h) storing the dot state ON/OFF value provided by step (g) within a shift register;

(i) repeating steps (e) through (h) for each channel of said print head; and (j) driving said print head to print the ON/OFF values stored within said shift register.

11. The method according to claim 10, further including the steps of:

(k) clearing the contents of said shift register; and (l) repeating steps (i) through (k) for each position of said print head within said print zone.

* * * * *